(12) United States Patent
Yamamoto et al.

(10) Patent No.: US 9,762,933 B2
(45) Date of Patent: *Sep. 12, 2017

(54) VIDEO DECODING APPARATUS AND VIDEO ENCODING APPARATUS

(71) Applicant: SHARP KABUSHIKI KAISHA, Osaka (JP)

(72) Inventors: Tomoyuki Yamamoto, Osaka (JP); Tomohiro Ikai, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/135,042

(22) Filed: Apr. 21, 2016

(65) Prior Publication Data

US 2016/0241886 A1 Aug. 18, 2016

Related U.S. Application Data

(60) Division of application No. 14/455,549, filed on Aug. 8, 2014, now Pat. No. 9,357,219, which is a
(Continued)

(30) Foreign Application Priority Data

Apr. 8, 2009 (JP) .................................. 2009-093606
Jun. 19, 2009 (JP) .................................. 2009-146509

(51) Int. Cl.
*H04N 7/50* (2006.01)
*H04N 19/91* (2014.01)
(Continued)

(52) U.S. Cl.
CPC ........... *H04N 19/91* (2014.11); *H04N 19/122* (2014.11); *H04N 19/134* (2014.11);
(Continued)

(58) Field of Classification Search
CPC .. H04N 7/50; H04N 7/26244; H04N 7/26271; H04N 7/26015; H04N 7/26031
See application file for complete search history.

(56) References Cited

U.S. PATENT DOCUMENTS

2004/0062309 A1   4/2004   Romanowski et al.
2005/0249291 A1*  11/2005  Gordon et al. .......... 375/240.18
(Continued)

FOREIGN PATENT DOCUMENTS

JO    2003-533141 A    11/2003
JP    2008-219205 A     9/2008
(Continued)

OTHER PUBLICATIONS

International Telecomunication Union (ITU), COM 16-C 123-E, "Video Coding Using Extended Block Sizes", Qualcomm Inc., Study Group 16—Contribution 123, pp. 1-4, Jan. 2009.
(Continued)

*Primary Examiner* — Nam Pham
(74) *Attorney, Agent, or Firm* — Birch, Stewart, Kolasch & Birch, LLP

(57) ABSTRACT

While maintaining a high degree of freedom in choosing partition sizes and transformation sizes adapted for local characteristics of videos, the amount of metadata is decreased. A video encoding apparatus (10) divides an input video into blocks of a prescribed size and encodes the video block by block. The video encoding apparatus is provided with: a prediction parameter determining portion (102) that decides the block partition structure; a predictive image producing portion (103) that generates predictive images, partition by partition, as prescribed by the partition structure; a transform coefficient producing portion (107) which applies one of the frequency transformations included in a prescribed transformation preset to prediction residuals, i.e. the differences between predictive images and the input
(Continued)

video; a transform restriction deriving portion (104) which generates the list of transform candidate, i.e. lists of frequency transformations that can be applied to each partition, on the basis of partition format information; and a variable-length-encoding portion (108) which, on the basis of the list of transform candidate and the transformation preset, performs variable-length encoding on transformation selection flags.

2 Claims, 16 Drawing Sheets

Related U.S. Application Data continuation of application No. 13/263,380, filed as application No. PCT/JP2010/054485 on Mar. 17, 2010, now Pat. No. 8,855,203.

(51) Int. Cl.
| | |
|---|---|
| *H04N 19/176* | (2014.01) |
| *H04N 19/134* | (2014.01) |
| *H04N 19/122* | (2014.01) |
| *H04N 19/463* | (2014.01) |
| *H04N 19/182* | (2014.01) |
| *H04N 19/513* | (2014.01) |
| *H04N 19/96* | (2014.01) |

(52) U.S. Cl.
CPC ......... *H04N 19/176* (2014.11); *H04N 19/182* (2014.11); *H04N 19/463* (2014.11); *H04N 19/513* (2014.11); *H04N 19/96* (2014.11)

(56) References Cited

U.S. PATENT DOCUMENTS

| | | |
|---|---|---|
| 2009/0147847 A1 | 6/2009 | Ishii et al. |
| 2009/0285285 A1 | 11/2009 | Fujisawa et al. |

FOREIGN PATENT DOCUMENTS

| | | |
|---|---|---|
| JP | 2009-5413 A | 1/2009 |
| JP | 2009-49779 A | 3/2009 |
| WO | WO 01/86961 A1 | 11/2001 |
| WO | WO 2006/112113 A | 10/2006 |

OTHER PUBLICATIONS

ITU-T Recomendations H.264, "Advanced video coding for generic audiovisual services" Series H: Audiovisual and Multimedia Systems, (Nov. 2007).

Ma et al., "High-definition Video Coding with Super-macroblocks," Proceedings of SPIE, SPIE International Society for Optical Engineering, vol. 6508, No. 650816, Jan. 29, 2007, pp. 1-12, XP002538135.

Steve Gordon, "Simplified Use of 8x8 Transforms", Joint Video Team (JVT) of ISO/IEC MPEG & ITU-T VCEG (ISO/IEC JTC1/SC29/WG11 and ITU-T SG16 Q.6) 9th Meeting , San Diego, Sep. 2-5, 2003.

Yamamoto et al., "Further result on constraining transform candidate in Extended Block Sizes," 38th Meeting; London, UK/Geneva, CH, VCEG-AL19, Jul. 1-8, 2009, pp. 1-5, XP030003700.

Notice of Allowance mailed Feb. 4, 2016 in related U.S. Appl. No. 14/455,549.

* cited by examiner

TRANSFORM SIZES OF SELECTABLE FREQUENCY TRANSFORMS:
4x4,8x8,16x16,16x1,1x16,8x1,1x8, 16x8, 8x16

TRANSFORM RESTRICTION (PROHIBITED FREQUENCY TRANSFORM LIST)

a: 4x4,8x8,16x1,1x16,8x1,1x8,16x8,8x16
b: 4x4,8x8,16x16,1x16,8x1,1x8,8x16
c: 4x4,8x8,16x16,1x16,8x1,1x8,8x16
d: 4x4,8x8,16x16,16x1,8x1,1x8,16x8
e: 4x4,8x8,16x16,16x1,8x1,1x8,16x8
f: 4x4,16x1,1x16,8x1,1x8,16x8,8x16
g: 4x4,8x8,16x16,1x16,8x16
h: 4x4,8x8,16x16,1x16,8x16
i: 4x4,8x8,16x16,16x1,16x8
j: 4x4,8x8,16x16,16x1,16x8
k: 16x16,8x8,16x1,1x16,16x8,8x16
l: 16x16,8x8,16x1,1x16,16x8,8x16
m: 16x16,8x8,16x1,1x16,16x8,8x16
n: 16x16,8x8,16x1,1x16,16x8,8x16

VIDEO DECODING APPARATUS AND VIDEO ENCODING APPARATUS

This application is a Divisional of copending application Ser. No. 14/455,549 filed on Aug. 8, 2014, which is a Continuation of application Ser. No. 13/263,380, filed on Oct. 7, 2011, which has issued as U.S. Pat. No. 8,855,203, which was filed as PCT International Application No. PCT/JP2010/054485 on Mar. 17, 2010, which claims the benefit under 35 U.S.C. §119(a) to Patent Application Nos. 2009-093606 and 2009-146509, filed in Japan on Apr. 8, 2009 and Jun. 19, 2009, all of which are hereby expressly incorporated by reference into the present application.

TECHNICAL FIELD

The present invention relates to a video encoding apparatus that produces encoded data by encoding a video, and a video decoding apparatus that reproduces the video from the encoded data of the video that is transmitted and accumulated.

BACKGROUND ART

<Introduction and Definitions of Basic Terms>

In a block-based video encoding system: an input video to be encoded is divided into predetermined unit of processing that is referred to as "macro blocks" (hereinafter, "MB"); encoding processing is executed for each of the MBs; and, thereby, encoded data is produced. When a video is reproduced, encoded data to be decoded is processed for each of the MBs, and a decoded image is produced.

There is a system specified in Non-Patent Literature 1 (H.264/AVC (Advanced Video Encoding)) as a block-based video encoding system that is widely prevalent at present. According to H.264/AVC, predictive images that predict an input video to be divided into MBs are produced, and a prediction residual that is a difference between the input video and the predictive image is calculated. A transform coefficient is derived by applying a frequency transform as represented by a discrete cosine transform (DCT) to the prediction residual. The derived transform coefficient is variable-length-encoded using a method that is referred to as "CABAC (Context-based Adaptive Binary Arithmetic Encoding)" or "CAVLC (Context-based Adaptive Variable Length Encoding)". The predictive image is produced by intra prediction that uses the spatial correlation of the video or inter prediction (motion compensating prediction) that uses the special correlation of the videos.

<Concept of Partition and Effects Thereof>

According to the inter prediction, an image that approximates an input video of an MB to be encoded is produced by a unit that is referred to as "partition". One or two motion vector(s) are related to each partition. A predictive image is produced by referring to an area that corresponds to the MB to be encoded on a local decoded image that is recorded in a frame memory, based on the motion vector(s). The local decoded image referred to in this case is called as "reference image". According to H.264/AVC, such partition sizes are available as "16×16", "16×8", "8×16", "8×8", "8×4", "4×8", and "4×4" in pixels. When a small partition size is used, a predictive image can be produced by designating each motion vector in fine units and, therefore, the predictive image can be produced that is close to the input video even when the spatial correlation of the motion is low. On the other hand, when a large partition size is used, the amount of codes can be reduced that are necessary for encoding a motion vector when the spatial correlation of the motion is high.

<Concept of Transform Size and Effects Thereof>

For a prediction residual that is produced using a predictive image, spatial or temporal redundancy of the pixel value of the input video is reduced. In addition, an energy can be concentrated on a low frequency component of a transform coefficient by applying a DCT to the prediction residual. Therefore, by executing the variable-length-encoding using the bias of the energy, the amount of codes of the encoded data can be reduced compared to that of the case where no predictive image and no DCT are used.

According to H.264/AVC, a system (block-adaptive transform selection) is employed that selects a DCT adapted to the local property of the video from DCTs having plural kinds of transform sizes for the purpose of increasing the energy concentration on the low frequency component by the DCT. For example, when a predictive image is produced using the inter prediction, the DCT can be selected that is applicable to the transform of the prediction residual, from two kinds of DCTs that are an 8×8 DCT and a 4×4 DCT. The 8×8 DCT is effective for a flat area having relatively a small amount of high-frequency components because the spatial correlation of the pixel value can be used in a wide range in the 8×8 DCT. On the other hand, the 4×4 DCT is effective for an area having a large amount of high-frequency components such as an area that includes a contour of an object. It can be said that, according to H.264/AVC, the 8×8 DCT is the DCT for a large transform size and the 4×4 DCT is the DCT for a small transform size.

According to H.264/AVC, the 8×8 DCT and the 4×4 DCT can be selected when the area of a partition is equal to or larger than 8×8 pixels. The 4×4 DCT can be selected when the area of a partition is smaller than 8×8 pixels.

As above, according to H.264/AVC, a suitable partition size and a suitable transform size can be selected corresponding to the degree of each of the spatial correlation the pixel value or the spatial correlation of the motion vector that are the local properties of a video. Therefore, the amount of codes of the encoded data can be reduced.

<Description of Adaptive Transform Size Expansion and Partition Size Expansion>

Recently, high-definition videos have increased that have the resolution equal to or higher than the "HD (1920 pixels×1080 pixels)". Compared to the case of a conventional low-resolution video, in the case of a high-definition video, the spatial correlation of the pixel value and the spatial correlation of the motion vector on a video can take a wide range in a local area in the video. Above all, the high-definition video has a property that the spatial correlations are high in a local area for both of the pixel value and the motion vector.

Non-Patent Literature 2 describes a video encoding system according to which the amount of codes of encoded data is reduced by using the property of the spatial correlation in a high-definition video as above by expanding the partition size and the transform size in H.264/AVC.

More specifically, partition sizes such as "64×64", "64×32", "32×64", "32×32", "32×16", and "16×32" are added in addition to those that are specified in H.264/AVC. Furthermore, DCT that has three kinds of new transform sizes of "16×16 DCT", "16×8 DCT", and "8×16 DCT" are added in addition to those that are specified in H.264/AVC.

When the area of a partition is equal to or larger than 16×16 pixels, the 16×16 DCT, the 8×8 DCT, and the 4×4 DCT can be selected. When the partition size is 16×8, the 16×8 DCT, the 8×8 DCT, and the 4×4 DCT can be selected. When the partition size is 8×16, the 8×16 DCT, the 8×8 DCT, and the 4×4 DCT can be selected. When the partition size is 8×8, the 8×8 DCT, and the 4×4 DCT can be selected. When the area of the partition is smaller than 8×8 pixels, the 4×4 DCT can be selected.

According to the system described in the Non-Patent Literature 2, the amount of codes of the encoded data can be reduced, because the partition size and the transform size that are adaptive to the local property of the video can be selected even for a high-definition video which has relatively wide dynamic ranges of spatial correlations of the pixel and the motion vector by switching among the above various partition sizes and transform sizes.

PRIOR ART DOCUMENT

Non-Patent Literature

Non-Patent Literature 1: ITU-T Recommendation H.264 (11/07)
Non-Patent Literature 2: ITU-T T09-SG16-C-0123

DISCLOSURE OF THE INVENTION

Problems that the Invention is to Solve

As above, in the video encoding system, it is effective to increase the kinds of partition sizes and transform sizes that can be selected for reducing the amount of codes of the encoded data. However, a new problem arises that the amount of codes of additional information is increased that is required to select the partition size and the transform size applied in decoding in each local area in a video.

According to Non-Patent Literatures 1 and 2, even when the partition size is large, a frequency transform whose transform size is small (the 4×4 DCT) can be used. However, a large partition tends to be selected in an area having a high spatial correlation of the pixel value and the motion vector. Therefore, when the frequency transform whose transform size is small is applied to such a partition, it is difficult to concentrate the energy of the prediction residual on fewer transform coefficients compared to the case where the frequency transform whose transform size is large is applied thereto. Therefore, a frequency transform whose transform size is small is rarely selected, and the additional information is wasted that is necessary for selecting the transform size. Especially, when the difference is increased in the magnitude between a large partition size and a small transform size due to expansion of the largest partition size, it becomes more difficult for a smaller transform size to be selected.

According to Non-Patent Literature 2, a frequency transform can be selected whose transform size is the same as the size of the partition for a rectangular partition. However, Non-Patent Literature 2 does not refer to anything about what criterion is used to determine the transform sizes that can be selected when kinds of transform size are further added.

The present invention was conceived in view of the above circumstances and an object thereof is to provide a video encoding apparatus that enables the amount of codes of additional information to be reduced while maintaining the possibility that the partition size and the transform size that are adaptive to the local property of a video can be selected when various partition sizes and various transform sizes are available in the video encoding apparatus. Another object thereof is to provide a video decoding apparatus that is able to decode encoded data encoded by the video encoding apparatus.

Means to Solve the Problems

A first technical means according to the present invention is a video encoding apparatus that divides an input video into predetermined size blocks and executes an encoding processing for each block, comprising: a prediction parameter determining portion that determines a partition structure of the block; a predictive image producing portion that produces a predictive image for each partition specified by the partition structure; a transform coefficient producing portion that applies any one of transforms included in a predetermined transform preset to a prediction residual that is a difference between the predictive image and the input video; a transform candidate deriving portion that determines a list of transform candidate that is a list of applicable transforms based on partition shape information; a frequency transform determining portion that, for each of the blocks, determines a transform selection flag indicating transforms to be applied to the prediction residual in the block from among transforms included in the list of transform candidate; and a variable-length-encoding portion that variable-length-codes the transform selection flag based on the list of transform candidate.

A second technical means is the video encoding apparatus of the first technical means, further comprising a transform restriction deriving portion that produces a prohibited transform list that is a list of transforms inapplicable to each partition based on the partition shape information, wherein the variable-length-encoding portion variable-length-encodes the transform selection flag based on the list of transform candidate that is derived based on the prohibited transform list and the transform preset.

A third technical means is the video encoding apparatus of the first technical means, wherein the partition shape information is a ratio of a longitudinal length to a lateral length of a partition, or a magnitude relation between the longitudinal length and the lateral length of the partition.

A fourth technical means is the video encoding apparatus of the first technical means, wherein the partition structure is expressed by a layer structure, and specifies that each partition is included in either layer corresponding to a shape of the partition, and the partition shape information includes a layer that the partition belongs to.

A fifth technical means is the video encoding apparatus of the first technical means, wherein the predetermined transform preset includes at least one transform whose transform size is a square and at least one transform whose transform size is a laterally long rectangle or a longitudinally long rectangle, when a lateral length of a partition is longer than a longitudinal length thereof, the transform candidate deriving portion includes at least one laterally long rectangle transform in the list of transform candidate, when a longitudinal length of a partition is longer than a lateral length thereof, the transform candidate deriving portion includes at least one longitudinally long rectangle transform in the list of transform candidate, and when a longitudinal length of a partition is equal to a lateral length thereof, the transform candidate deriving portion includes at least one square transform in the list of transform candidate.

A sixth technical means is the video encoding apparatus of the first technical means, wherein the predetermined transform preset includes at least one or more transforms whose transform size is a laterally long rectangle whose height is one pixel, and when a lateral length of a partition is longer than a longitudinal length thereof, the transform candidate deriving portion includes in the list of transform candidate a transform whose transform size is a laterally long rectangle whose height is one pixel.

A seventh technical means is the video encoding apparatus of the second technical means, wherein the predetermined transform preset includes at least two or more transforms whose transform sizes mutually are in an analogous relationship, and when each of the smallest values of a longitudinal length and a lateral length of a partition is equal to or larger than a predetermined threshold value, the transform restriction deriving portion includes in the prohibited transform list a transform whose transform size is the smallest among those of transforms having the transform size bearing an analogous relationship with each other.

An eighth technical means is the video encoding apparatus of the fourth technical means, wherein the predetermined transform preset includes a first transform and a second transform having an equal magnitude relation between a longitudinal length and a lateral length in the transform size to that of the first transform and having smaller transform size than that of the first transform, the partition structure is expressed by a layer structure and specified that each partition is included in either layer corresponding to a shape of the partition, and the transform candidate deriving portion includes the first transform in the list of transform candidate and does not include the second transform in the list of transform candidate when a partition belongs to a predetermined layer that is not a lowermost layer, and includes the second transform in the list of transform candidate when the partition belongs to a layer lower than the predetermined layer that is not the lowermost layer.

A ninth technical means is a video decoding apparatus that executes a decoding processing for input encoded data for each block, comprising: a variable-length decoding portion that decodes a partition structure of a block to be processed from the input encoded data; a predictive image producing portion that produces a predictive image for each partition that is specified by the partition structure; and a transform candidate deriving portion that determines a list of transform candidate that is a list of applicable transforms based on partition shape information, wherein the variable-length-decoding portion decodes a transform selection flag based on the input decoded data and the list of transform candidate as well as decodes a transform coefficient of the block to be processed based on the transform selection flag, the video decoding apparatus further comprises: a prediction residual reconstructing portion that reconstructs a prediction residual by applying inverse transforms to the transform coefficient, the inverse transforms corresponding to transforms, the transforms being specified by the transform selection flag; and a local decoded image producing portion that outputs decoded image data based on the predictive image and the prediction residual, the decoded image data corresponding to the block to be processed.

A tenth technical means is the video decoding apparatus of the ninth technical means, further comprising a transform restriction deriving portion that produces a prohibited transform list that is a list of transforms inapplicable to each partition based on the partition shape information, wherein the variable-length-decoding portion variable-length-decodes the transform selection flag based on the list of transform candidate that is derived based on the prohibited transform list and the transform preset.

An eleventh technical means is the video decoding apparatus of the ninth technical means, wherein the partition shape information is a ratio of a longitudinal length to a lateral length of a partition, or a magnitude relation between the longitudinal length and the lateral length of the partition.

A twelfth technical means is the video decoding apparatus of the ninth technical means, wherein the partition structure is expressed by a layer structure, and specifies that each partition is included in either layer, and the partition shape information includes a layer that the partition belongs to.

A thirteenth technical means is the video decoding apparatus of the ninth technical means, wherein the predetermined transform preset includes at least one transform whose transform size is a square and at least one transform whose transform size is a laterally long rectangle or a longitudinally long rectangle, when a lateral length of a partition is longer than a longitudinal length thereof, the transform candidate deriving portion derives a list of transform candidate including at least one laterally long rectangle transform, when a longitudinal length of a partition is longer than a lateral length thereof, the transform candidate deriving portion derives a list of transform candidate including at least one longitudinally long rectangle transform, and when a longitudinal length of a partition is equal to a lateral length thereof, the transform candidate deriving portion derives a list of transform candidate including at least one square transform.

A fourteenth technical means is the video decoding apparatus of the tenth technical means, wherein the predetermined transform preset includes at least two or more transforms whose transform sizes mutually are in an analogous relationship, and when each of the smallest values of a longitudinal length and a lateral length of a partition is equal to or larger than a predetermined threshold value, the transform candidate deriving portion derives a list of transform candidate excluding a transform whose transform size is the smallest among those of transforms bearing an analogous relationship with each other.

A fifteenth technical means is the video decoding apparatus of the twelfth technical means, wherein the predetermined transform preset includes a first transform and a second transform having an equal magnitude relation between a longitudinal length and a lateral length in the transform size to that of the first transform and having smaller transform size than that of the first transform, the partition structure is expressed by a layer structure, and specifies that each partition is included in either layer corresponding to a shape of the partition, and the transform candidate deriving portion includes the first transform and excludes the second transform from the list of transform candidate when a partition belongs to a predetermined layer that is not a lowermost layer, and includes the second transform in the list of transform candidate when the partition belongs to a layer lower than the predetermined layer that is not the lowermost layer.

Effects of the Invention

According to the video encoding apparatus of the present invention, an amount of codes of additional information is able to be reduced while maintaining the possibility at a high level that the transform size suitable to the local property of a video is able to be selected; and further a processing amount of encoding processing is able to be reduced by limiting the transform sizes that can be selected to highly effective ones when a specific partition size is selected. According to the decoding apparatus of the present invention, encoded data is able to be decoded that is encoded by the video encoding apparatus.

MODES FOR CARRYING OUT THE INVENTION

First Embodiment

Figure 1:
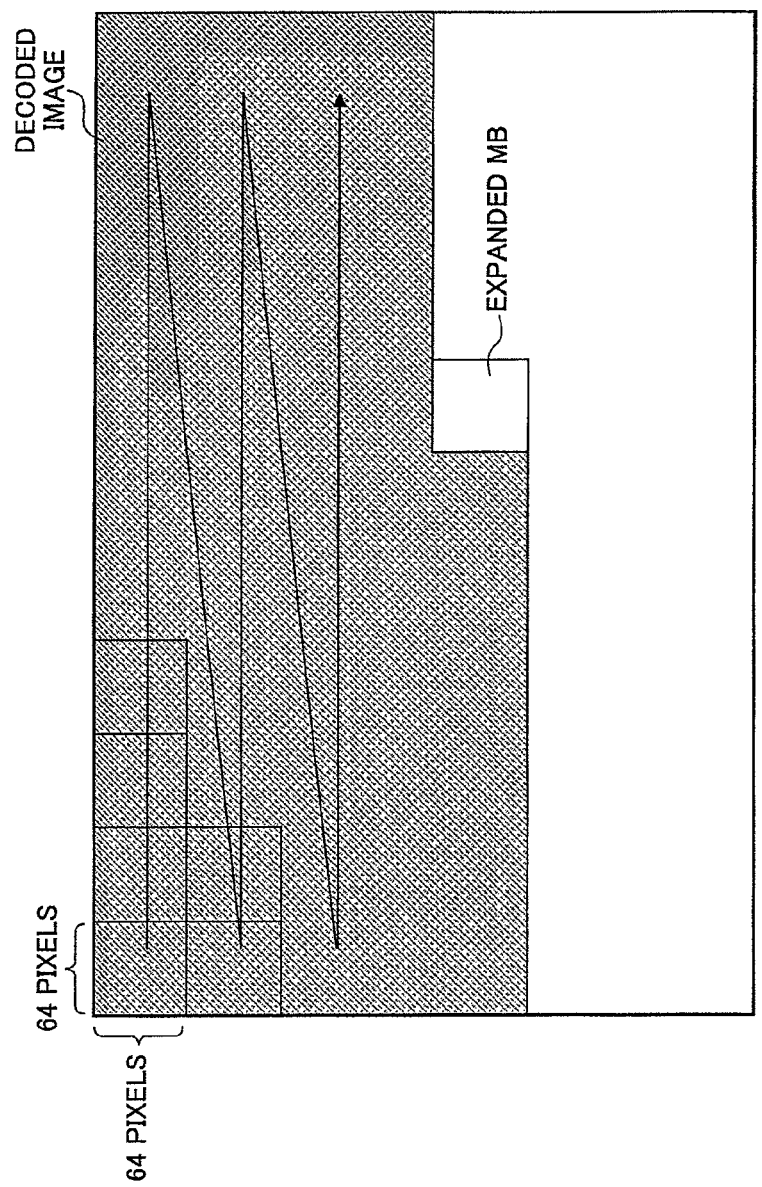
FIG. 1 is a diagram for explaining the definitions of an expanded macro block (MB) and a processing sequence.

A video encoding apparatus 10 and a video decoding apparatus 20 that are an embodiment of a video encoding apparatus and a video decoding apparatus according to the present invention will be described with reference to FIGS. 1 to 11. In the description of these drawings, the same reference numerals are given to the same components and the descriptions of the same components are omitted.

In the following description, it is assumed that input videos are sequentially input to the video encoding apparatus by expanded MB that is configured by 64×64 pixels and processing is executed therefor. An input order of the expanded MBs is assumed to be the order of a raster scanning as shown as FIG. 1. However, the present invention is applicable to the case where the size of the expanded MB is the one other than those above. Especially, the present invention is effective for expanded MBs having a size larger than a size of 16×16 pixels that is a unit amount to be processed widely used at present.

It is assumed that the processing executed in the video encoding apparatuses and the video decoding apparatuses in the following description is realized based on H.264/AVC, and that portions that do not specifically mention the opera- tions follow the operations according to H.264/AVC. However, the video encoding system that the present invention is applicable to is not limited to H.264/AVC and the present invention is applicable to systems that are similar to H.264/AVC such as VC-1, MPEG-2, and AVS, and other video encoding system that employs processing for each block or a frequency transform.

<Configuration of Video Encoding Apparatus 10>

Figure 2:
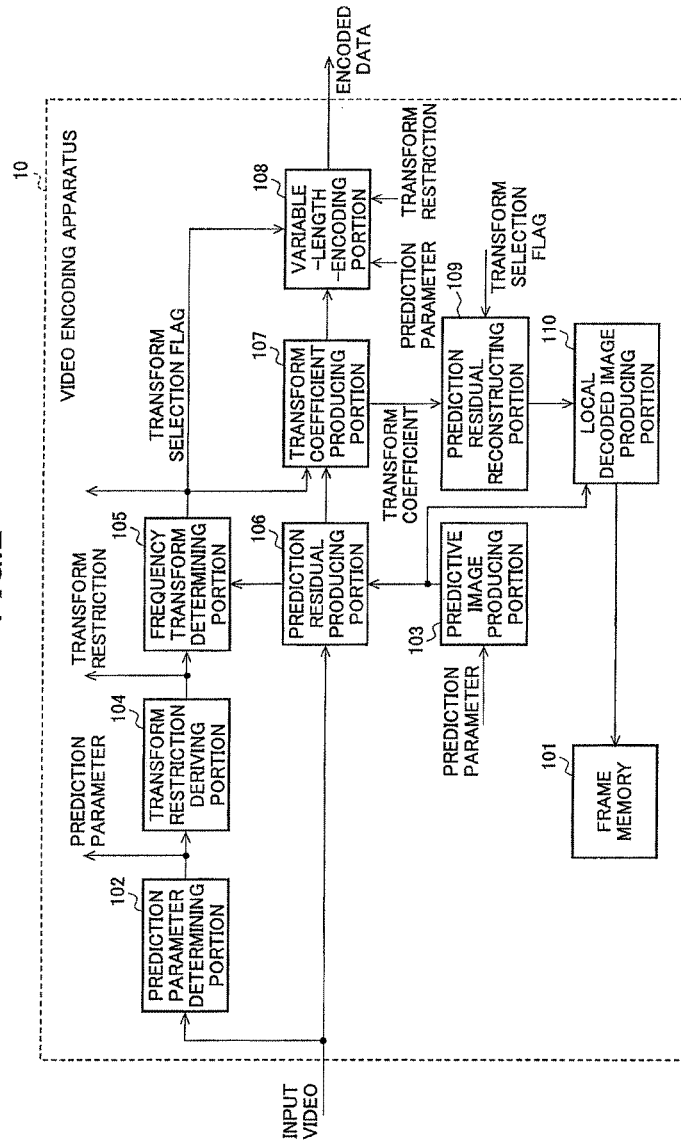
FIG. 2 is a block diagram of an embodiment of a video encoding apparatus of the present invention.

FIG. 2 is a block diagram of the configuration of the video encoding apparatus 10. The video encoding apparatus 10 includes a frame memory 101, a predictive parameter determining portion 102, a predictive image producing portion 103, a transform restriction deriving portion 104, a frequency transform determining portion 105, a prediction residual producing portion 106, a transform coefficient producing portion 107, a variable-length-encoding portion 108, a prediction residual reconstructing portion 109, and a local decoded image producing portion 110.

<Frame Memory 101>

The frame memory 101 has a local decoded image recorded thereon. The "local decoded image" is an image that is produced by adding a predictive image to a prediction residual that is reconstructed by applying an inverse frequency transform to a transform coefficient. At the time when a specific expanded MB of a specific frame of the input video is processed, a local decoded image for a frame that is encoded prior to a frame to be processed and a local decoded image that corresponds to an expanded MB that is encoded prior to the expanded MB to be processed, are recorded in the frame memory 101. It is assumed that the local decoded image recorded in the frame memory 101 can suitably be read by each of the components in the apparatus.

<Prediction Parameter Determining Portion 102 (Definition of Partition Structure, Description of Mode Determination)>

The prediction parameter determining portion 102 determines a prediction parameter based on a local property of the input video and outputs the prediction parameter. The prediction parameter includes at least a partition structure that expresses the structure of partitions that are applied to each portion in an expanded MB, and motion information for inter prediction (a motion vector and an index of a local decoded image to be referred to (reference image index)). The prediction parameter may also include intra prediction mode that indicates a predictive image producing method for intra prediction.

Figure 3:
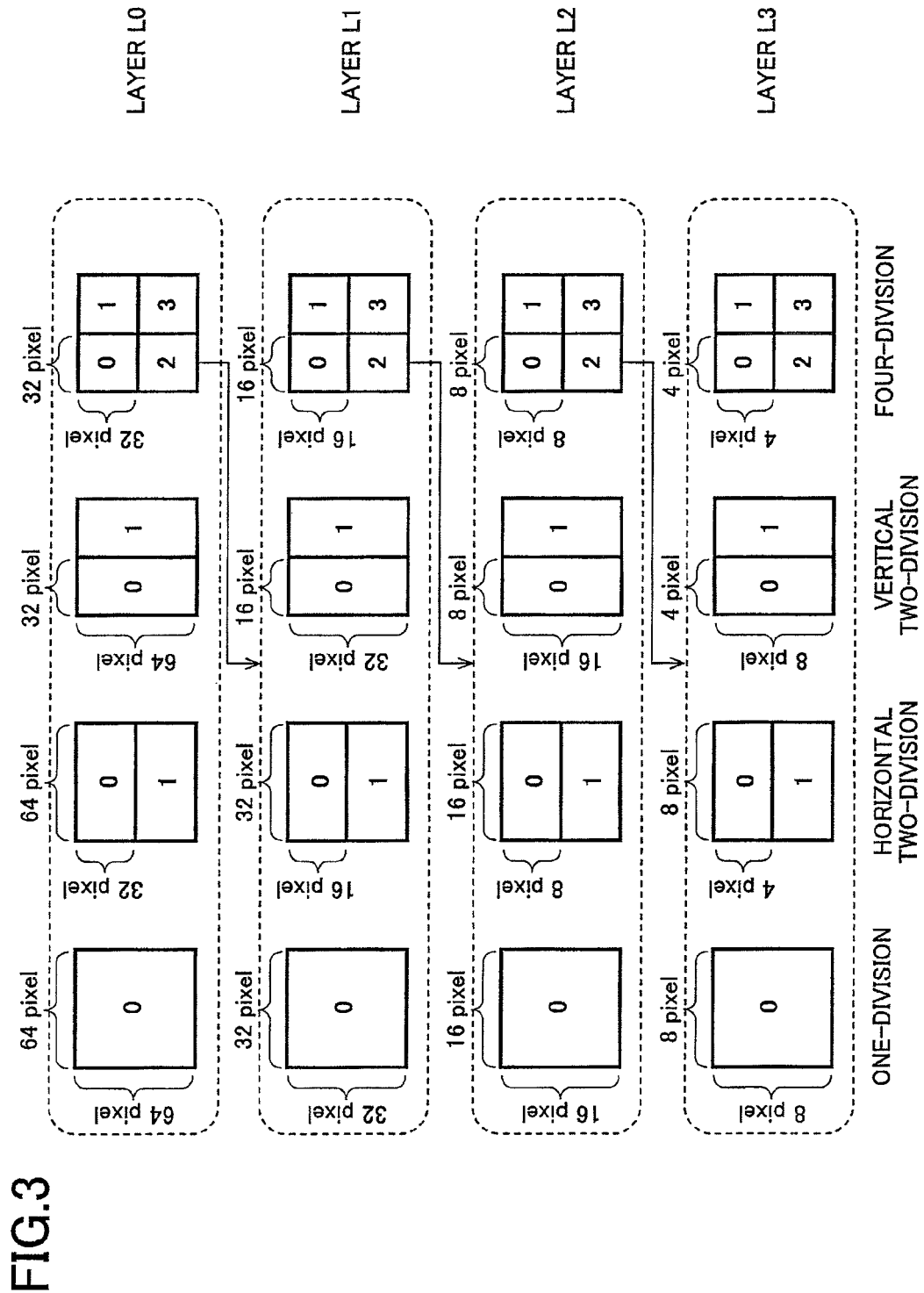
FIG. 3 is a diagram for explaining the definitions of a partition layer structure and a processing sequence.

The details of the partition structure will be described with reference to FIG. 3. The partition structure is expressed by a hierarchical structure. A layer in which 64×64 pixels is handled as a unit amount for processing is defined as "layer L0". A layer in which 32×32 pixels is handled as a unit amount for processing is defined as "layer L1". A layer in which 16×16 pixels is handled as a unit amount for processing is defined as "layer L2". A layer in which 8×8 pixels is handled as a unit amount for processing is defined as "layer L3". In each layer, any one type of divisions can be selected as a dividing method therefor, that are one-division that does not execute any division, horizontal two-division that divides an area into two equal areas using a straight line in the horizontal direction, vertical two-division that divides an area into two equal areas using a straight line in the vertical direction, and four-division that divides an area into four equal areas using two straight lines in the horizontal direction and the vertical direction. A layer whose unit of processing is large is referred to as "upper layer" and a layer whose unit of processing is small is referred to as "lower layer". In the embodiment, the layer L0 is the uppermost layer and the layer L3 is the lowermost layer. The partition structure is expressed by identifying the dividing method in each layer sequentially from the layer L0 that is the uppermost layer. More specifically, the partition structure can uniquely be expressed according to the following procedure.

(Step S10) When the dividing method for the layer L0 is any one of the one-division, the horizontal two-division, and the vertical two-division, an area expressed using the dividing method is determined to be the partition of the unit of processing in the layer L0. When the dividing method is the four-division, the partition is determined according to step S11 for each of the divided areas.

(Step S11) When the dividing method for the layer L1 is any one of the one-division, the horizontal two-division, and the vertical two-division, an area expressed using the dividing method is determined to be a partition of the unit of processing in the layer L1. When the dividing method is the four-division, a partition is determined according to step S12 for each of the divided areas.

(Step S12) When the dividing method for the layer L2 is any one of the one-division, the horizontal two-division, and the vertical two-division, an area expressed using the dividing method is determined to be a partition of the unit of processing in the layer L2. When the dividing method is the four-division, a partition is determined according to step S13 for each of the divided areas.

(Step S13) An area expressed using the dividing method for the layer L3 is determined to be a partition of the unit of processing in the layer L3.

Processing order of each partition in an expanded MB will be described. As depicted in FIG. 3, in each layer, processing is executed in raster scanning order regardless of the dividing method. However, when the four-division is selected as the dividing method in a layer other than the lowermost layer (the layer L3), the partition expressed for a lower layer is processed in raster scanning order for each of areas acquired by the four-division. In portions that will be described later, the above processing order will be applied when processing a partition in an expanded MB.

A layer Lx to which a partition p belongs is derived according to the following procedure.

(Step S20) When the size of the partition p is equal to the size of a partition that is produced by the one-division, the horizontal two-division, or the vertical two-division of a specific layer Ly, the value of Lx is set to be "Ly".

(Step S21) In the case other than the above, the value of Lx is set to be "L3" (Lx is set to be the lowermost layer).

<Description of Partition Shape>

Information characterizing each partition that belongs to the partition structure, that is, the partition size, information indicating the feature of the partition size, or the layer in the partition structure is referred to as "partition shape information". All of such items are each partition shape information as, for example, the partition size itself such as 32×32, information that indicates whether the partition size is larger than a specific partition size, the ratio of the longitudinal length to the lateral length of the partition, the magnitude relation between the longitudinal length and the lateral length of the partition, the minimal value and the maximal value of the longitudinal length and the lateral length of the partition, and the layer that the partition belongs to.

The prediction parameter is determined by a rate distortion determination. In the rate distortion determination, for each prediction parameter candidate, the amount of codes of the encoded data acquired when the expanded MB to be processed is encoded using the prediction parameter is calculated and a cost referred to as "rate distortion cost" is calculated from the local decoded image and distortion of the input video, and a prediction parameter is selected that minimizes the cost. The rate distortion cost is calculated for all possible combinations of the partition structures and pieces of motion information that are prediction parameters. The best combination thereof is determined to be the prediction parameter. Denoting the amount of codes of the encoded data of the expanded MB as "R" and a mean squared error between the input video and the local decoded image that correspond to the expanded MB as "D", the rate distortion cost C can be calculated according to an equation $C=D+\lambda R$ using a parameter $\lambda$ that represents the relation between the amount of codes R and the error D.

According to the rate distortion determination, the prediction parameter that is suitable for encoding the expanded MB to be processed, that is, a suitable partition structure and motion information that corresponds to each partition are determined and output.

When the rate distortion cost is calculated for a specific prediction parameter, the frequency transform may not uniquely be determined that is applied to the expanded MB to be processed. In this case, the rate distortion cost can be used as a rate distortion cost that is acquired when a specific frequency transform is applied, or a minimal rate distortion cost can be used that is acquired when all of a plurality of frequency transforms are applied.

<Predictive Image Producing Portion 103>

The predictive image producing portion 103 produces a predictive image of the expanded MB to be processed based on the prediction parameter input thereinto, and outputs the predictive image. The production of the predictive image is executed according to the following procedure.

(Step S30) Based on the partition structure included in the prediction parameter, the expanded MB is divided into partitions and a predictive image for each of the partitions is produced according to step S31.

(Step S31) The motion information corresponding to the partition to be processed, that is, the motion vector and the reference image index are read from the prediction parameter. On a local decoded image indicated by the reference image index, the predictive image is produced by motion compensating prediction based on the pixel value of the area represented by the motion vector.

<Prediction Residual Producing Portion 106>

The prediction residual producing portion 106 produces a prediction residual of an expanded MB based on the input video and the predictive image that are input thereinto and outputs the prediction residual. A prediction residual is two-dimensional data that has the same size as that of the expanded MB and each element thereof is a difference value between a pixel of the input video and a corresponding pixel of the predictive image.

<Transform Coefficient Producing Portion 107>

The transform coefficient producing portion 107 applies the frequency transform to the prediction residual based on the prediction residual and a transform selection flag that are input thereinto, thereby, produces a transform coefficient, and outputs the transform coefficient. A transform selection flag indicates the frequency transform to be applied to each partition of an expanded MB. The transform coefficient producing portion 107 selects the frequency transform indicated by the transform selection flag for each partition in the expanded MB and applies the frequency transform selected to the prediction residual. The frequency transform indicated by the transform selection flag is anyone of the frequency transforms included in a set (transform preset) of all frequency transforms that are applicable by the transform coefficient producing portion 107.

The transform preset in the embodiment includes nine kinds of frequency transforms that are a 4×4 DCT, an 8×8 DCT, a 16×16 DCT, a 16×8 DCT, an 8×16 DCT, a 16×1 DCT, a 1×16 DCT, an 8×1 DCT, and a 1×8 DCT. Each of the frequency transforms specified herein corresponds to a DCT (Discrete Cosine Transform) having a specific transform size (for example, the 4×4 DCT corresponds to a discrete cosine transform whose transform size is 4×4 pixels). The present invention is not limited only to set of the above frequency transforms, and is also adaptable to any subset of the transform presets. Frequency transforms including discrete cosine transforms that have other transform sizes such as, for example, a 32×32 DCT and a 64×64 DCT, may be included in the transform preset. Frequency transforms other than the discrete cosine transform, such as, for example, a Hadamard transform, a sine transform, and a wavelet transform, or frequency transforms including transforms that approximate these transforms may be included in the transform preset.

Processing that applies a frequency transform having a transform size of W×H to a partition of M×N pixels is the processing that is indicated by a pseudo code as follows. An area R (x, y, w, h) means an area that is present at a position displaced rightward by x pixels and downward by y pixels from the uppermost and leftmost point in a partition as the starting point and that has a width of w pixels and a height of h pixels.

```
for (j=0, j<N, j+=H) {
    for (i=0, i<M, i+=W) {
        The frequency transform is applied to an area R (i, j, W, H)
    }
}
```

<Transform Restriction Deriving Portion 104>

The transform restriction deriving portion 104 derives a restriction concerning the frequency transform that can be selected in each partition in the expanded MB as a transform restriction based on the prediction parameter that is input thereinto, and outputs the transform restriction. The transform restriction deriving portion 104 derives the transform restriction of each partition based on the partition shape information of the partition that is determined by the prediction parameter.

The transform restriction is defined as a set of prohibited transform lists that are correlated with the partitions in the expanded MB. A prohibited transform list includes as its elements frequency transforms that can not be selected for their correlated partition (prohibited frequency transforms) of the frequency transforms that are included in the transform preset. In other words, the remainder that is obtained by extracting the elements of the prohibited transform list from the elements of the transform preset constitutes a set of the frequency transform that can be selected for the correlated partition (list of transform candidate).

The prohibited transform list and the list of transform candidate can be indicated by transform set information that includes information indicating whether each transform is included in the set. Denoting the number of transforms included in the transform preset as "Nt", the number of combinations of the transforms is the Nt-th power of two and, therefore, transforms included in the set can be expressed by transform set information that has a range of values from zero to $2^{Nt-1}$ (the Nt-th power of two minus one). Not all combinations of the transforms always need to be expressed by the transform set information and a value corresponding to a specific combination may be expressed. In a straightforward example, when the transform preset includes only the 4×4 DCT and the 8×8 DCT, a prohibition list can be expressed by a one-bit flag that indicates whether the 4×4 DCT (or the 8×8 DCT) is prohibited. The list of transform candidate can also be expressed by values of zero to two by respectively relating the 4×4 DCT to zero, a combination of the 4×4 DCT and the 8×8 DCT to one, and the 8×8 DCT to two.

The meaning of the transform set information may be changed for each of the layer, the partition, a combination of blocks, etc. The same value "zero" of the transform set information may mean the 16×16 DCT for the layer L0, the 8×8 DCT for the layer L1, and the 4×4 DCT for the layer L2. The prohibited transform list and the list of transform candidate can each be expressed using values in a small range by changing the meaning of the values of the transform set information.

Therefore, it is assumed that the transform restriction and the list of transform candidate in the present invention are considered to be equal to the transform set information that indicates the transform restriction and the transform candidate without being swayed by the term "list".

A prohibited transform list Lp for a specific partition p is produced according to the following procedure. It is assumed that the size of the partition p is M×N pixels (laterally M pixels and longitudinally N pixels) and that the partition p belongs to the layer Lx.

(Step S40) Lp is set to be empty.
(Step S41) Frequency transform is added to Lp, whose transform size is larger than M×N pixels.
(Step S42) Frequency transform is added to Lp, that is determined corresponding to the value of Min(M, N).
(Step S43) Frequency transform is added to Lp, that is determined corresponding to the value of M÷N.
(Step S44) Frequency transform that is determined depending on the value of the layer Lx is added to Lp.

Note that partition shape information includes information indicating whether the transform size is larger than M×N pixels, the value of Min(M, N), the value of M÷N, and the value of the layer Lx.

<Limitation on Transform Size According to Min(M, N)>

Figure 4:
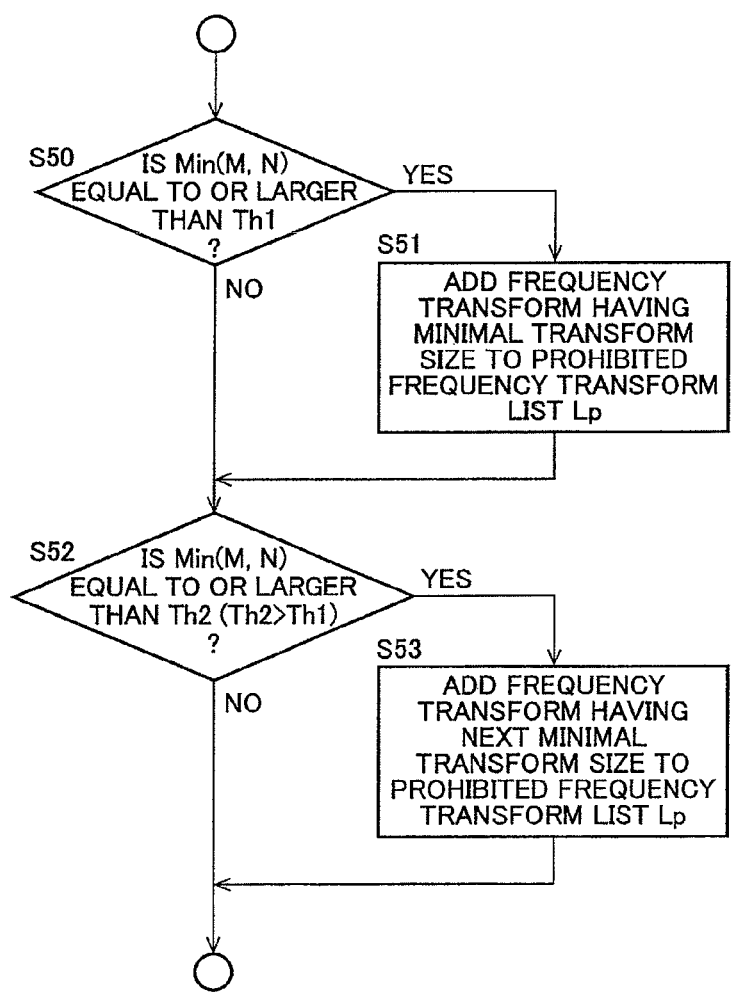
FIG. 4 is a flowchart for explaining an example of producing processing of a prohibited transform list.

A more detailed procedure of step S42 will be described with reference to a flowchart of FIG. 4.

(Step S50) When Min(M, N) is equal to or larger than a predetermined threshold value Th1 (for example, Th1 is Th1=16 pixels), the procedure is advanced to step S51 and, when Min(M, N) takes another value, the procedure is advanced to step S52.

(Step S51) When there exist two or more frequency transforms that have transform sizes in an analogous relationship in a frequency transform list, the frequency transform, whose transform size is the smallest (the 4×4 DCT, the 8×8 DCT, or the 1×8 DCT) in a set of the frequency transforms having the transform sizes in an analogous relationship is added to Lp, and the procedure is advanced to step S52. The analogous relationship in this case includes a similarity relationship. For example, transform sizes such as 16×16, 8×8, and 4×4 in the transform preset of the embodiment are in an analogous relationship. The analogous relationship also includes an approximate analogous relationship. For example, the transform sizes of 16×1 and 8×1 and the transform sizes of 1×16 and 1×8 in the transform preset of the embodiment are in an analogous relationship. Though not applied in the following description, frequency transforms can be classified into three categories of a square, a longitudinally long rectangle, and a laterally long rectangle based on the sizes thereof and the frequency transforms belonging to each of the categories can be regarded as being in an analogous relationship.

(Step S52) When Min(M, N) is equal to or larger than a predetermined threshold Th2 (for example, Th2 is Th2=32 pixels), the procedure is advanced to step S53 and, in other cases, the processing comes to an end.

(Step S53) When there exist three or more frequency transforms that have transform sizes in an analogous relationship in the transform preset, the frequency transform, whose transform size is the second smallest (the 8×8 DCT) in each combination of the frequency transforms that have the transform sizes in the analogous relationship is added to LP, and the processing comes to an end. However, Th1 and Th2 are Th2>Th1.

A partition is a unit of motion compensation. The partition configuration is determined such that the motions between the frames of the image in the partition are uniform in order to bring a predictive image that is produced partition by portion using motion vectors close to the input image. A large partition is allocated to a large object (or a portion thereof) in the input video and a small partition is allocated to a small object therein. Generally, in the input video, the spatial correlation of the pixel values in an area corresponding to a large object is high compared to the spatial correlation of the pixel values of an area corresponding to a small object. Therefore, a frequency transform whose transform size is large is effective compared to a frequency transform whose transform size is small for a large partition. Therefore, even when a frequency transform whose transform size is somewhat small is determined to be a prohibited transform for a large partition, the amount of codes of the decoded data is not substantially increased.

<Limitation on Transform Size According to Value of M÷N>

Figure 5:
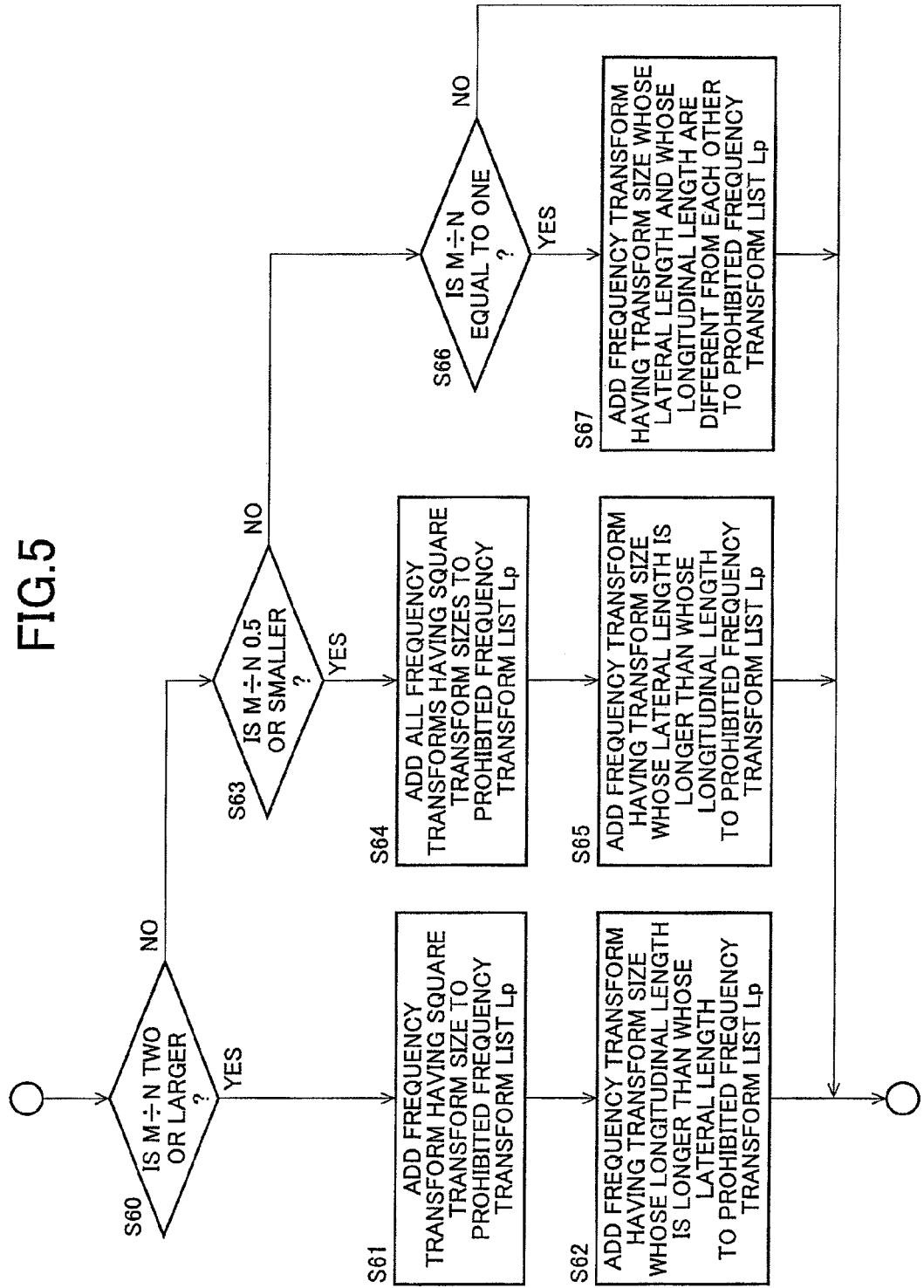
FIG. 5 is a flowchart for explaining another example of the producing processing of the prohibited transform list.

A more detailed procedure of step S43 will be described with reference to a flowchart of FIG. 5.

(Step S60) When the value of M÷N is equal to or larger than two (the lateral length of the partition p is two or more times as long as the longitudinal length thereof), the procedure is advanced to step S61 and, in other cases, the procedure is advanced to step S63.

(Step S61) All frequency transforms that have square transform sizes (the 4×4 DCT, the 8×8 DCT, and the 16×16 DCT) are added to Lp, and the procedure is advanced to step S62.

(Step S62) The frequency transforms whose longitudinal lengths of their transform sizes are longer than the lateral length thereof (the 8×16 DCT and the 1×16 DCT) are added to Lp, and the procedure comes to an end.

(Step S63) When the value of M÷N is equal to or smaller than 0.5 (the longitudinal length of the partition p is two or more times as long as the lateral length thereof), the procedure is advanced to step S64 and, in other cases, the procedure is advanced to step S66.

(Step S64) All frequency transforms that have square transform sizes (the 4×4 DCT, the 8×8 DCT, and the 16×16 DCT) are added to Lp, and the procedure is advanced to step S65.

(Step S65) Frequency transforms whose lateral lengths of their transform sizes are longer than the longitudinal length thereof (the 16×8 DCT and the 16×1 DCT) are added to Lp, and the procedure comes to an end.

(Step S66) When the value of M÷N is equal to one (the lateral and the longitudinal lengths of the partition p are equal), the procedure is advanced to step S67 and, in other cases, the procedure comes to an end.

(Step S67) Frequency transforms that have transform sizes having lateral lengths and longitudinal lengths that are different from each other (the 16×8 DCT, the 16×1 DCT, the 8×16 DCT, and the 1×16 DCT) are added to Lp.

Figure 6:
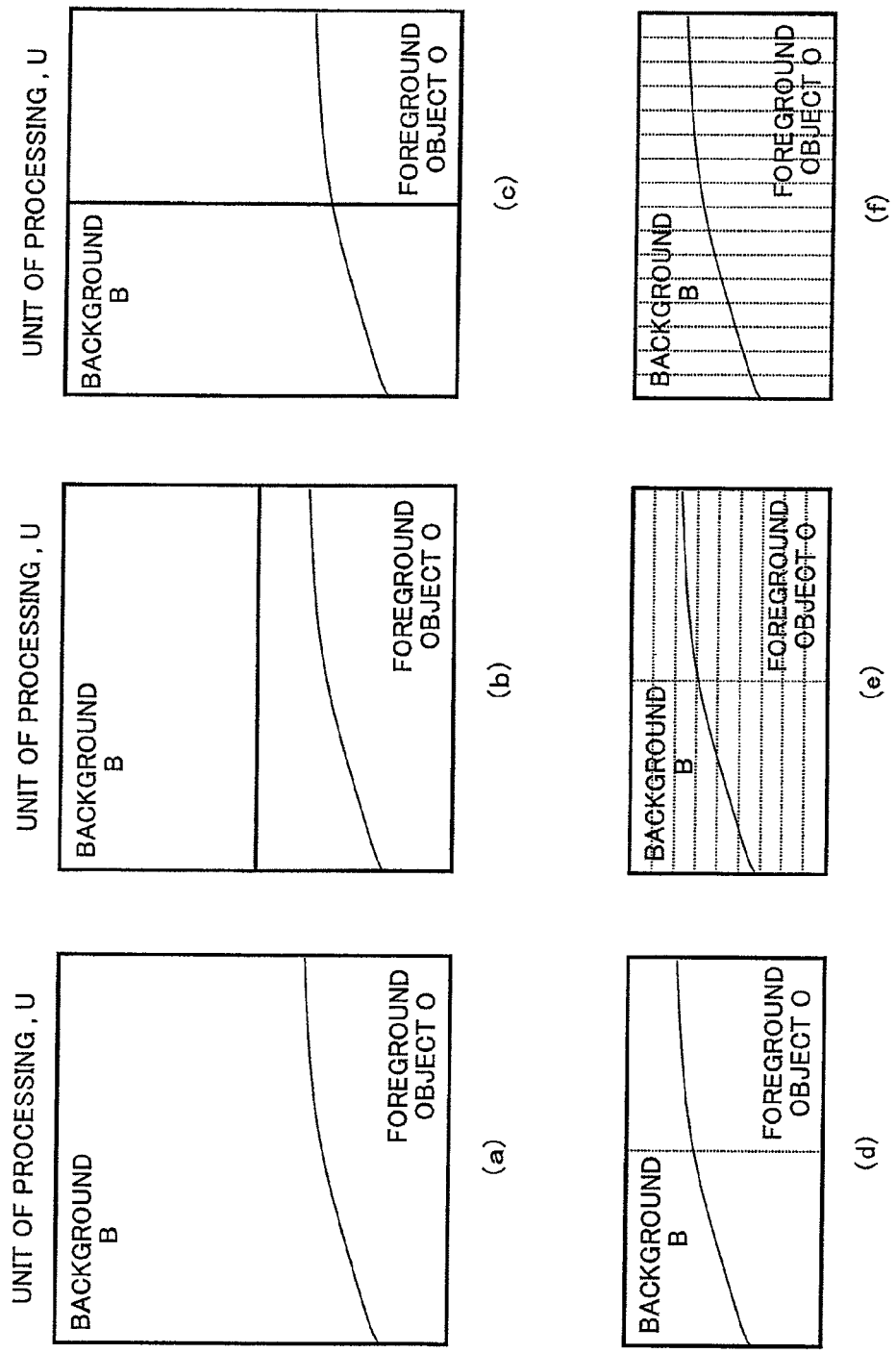
FIG. 6 are diagrams for explaining partition division executed when the prohibited transform list is produced.

Intention of steps S61 and S62 will be described with reference to FIG. 6. As depicted in FIG. 6(a), it is assumed that two objects (a foreground object O and a background B) are present in a unit of processing, U, in a layer and a border between the foreground object O and the background B is present in the lower portion of the unit of processing, U. In this case, a partition of a laterally long rectangle which the value of M÷N is equal to or larger than two as depicted in FIG. 6(b) is selected. In contrast, no partition of a longitudinally long rectangle as depicted in FIG. 6(c) is selected.

The relation between the transform size and the amount of codes of the encoded data for a partition that includes both of the background B and the foreground object O in the case where a laterally long rectangular partition is selected will be described with reference to FIGS. 6(d) to (f). FIGS. 6(d), (e), and (f) depict the relations between the partition and the transform size in the cases where a square, a laterally long rectangular, and a longitudinally long rectangular transform sizes are applied to the partition. When the frequency transform whose transform size is a square (FIG. 6(d)) or the frequency transform whose transform size is a longitudinally long rectangle (FIG. 6(f)) is used, a border tends to be present in the area to which the frequency transform is applied.

On the other hand, when the frequency transform having a transform size of a laterally long rectangle (FIG. 6(e)) is used, a border rarely presents in the area to which the frequency transform is applied. When a border is present in the area to which the frequency transform is applied, the energy can not be concentrated on the low frequency component of the transform coefficient due to the frequency transform and, therefore, the amount of codes required for the encoding of the transform coefficient is increased. On the other hand, when no border is present in the area to which the frequency transform is applied, the energy can be concentrated on the low frequency component of the transform coefficient due to the frequency transform and, therefore, the amount of codes required for the encoding of the transform coefficient is reduced. Therefore, for a laterally long rectangular partition, it is more effective to apply the frequency transform whose transform size is a laterally long rectangle compared to the case where the frequency transform whose transform size is a square or a longitudinally long rectangle is applied. Therefore, even when the frequency transform whose transform size is a square or a longitudinally long rectangle is set to be a prohibited transform for a laterally long rectangular partition, the amount of codes of the encoded data is not substantially increased.

Intention of each of steps S64 and S65 is the same as above. Even when the frequency transform whose transform size is a square or a laterally long rectangle is set to be a prohibited transform for a longitudinally long rectangular partition, the amount of codes of the encoded data is not substantially increased.

Figure 7:
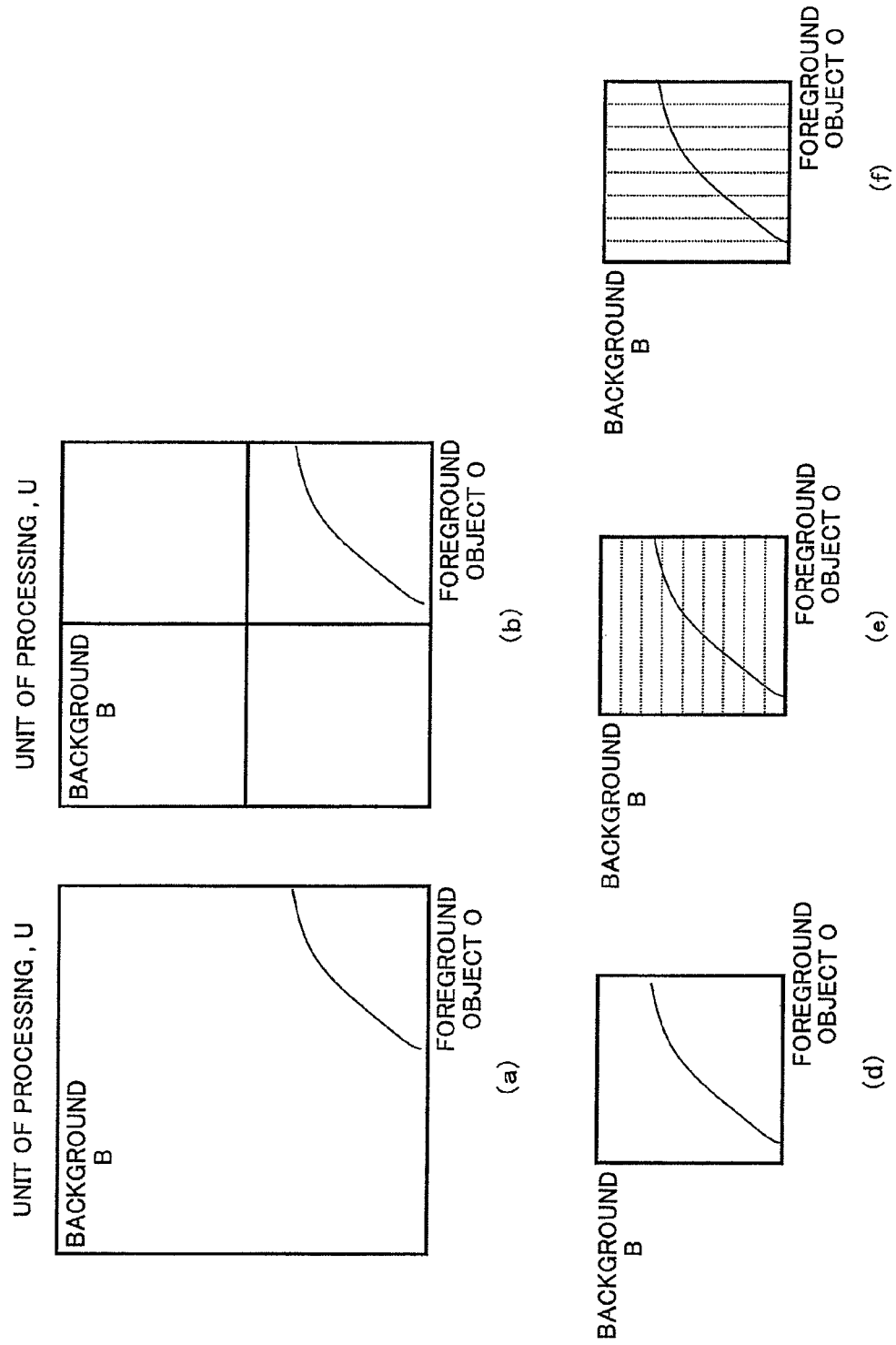
FIG. 7 are other diagrams for explaining the partition division executed when the prohibited transform list is produced.

Intention of step S66 will be described with reference to FIG. 7. As depicted in FIG. 7(a), it is assumed that two objects (the foreground object O and the background B) are present in the unit of processing, U, in a layer and the border between the foreground object O and the background B is present in the lower-right portion of the unit of processing, U. In this case, a partition is selected that is a square to acquire the value of M÷N to be one as depicted in FIG. 7(b).

The relation between the transform size and the amount of codes of the encoded data for a partition (the lower-right partition) that includes both of the background B and the foreground object O, acquired when a square partition is selected will be described with reference to FIGS. 7 (*d*) to (*f*). FIGS. 7(*d*), (*e*), and (*f*) depict the relations between the partition and the transform sizes for the cases where a square, a laterally long rectangular, and a longitudinally long rectangular transform sizes are applied to the lower-right partition. In this case, when any one of the transform sizes of a square, a longitudinally long rectangle, and a laterally long rectangle is used the rate of the presence of a border does not vary so much in the area to which the frequency transform is applied. Therefore, for the lower-right partition, the difference in the amount of codes of the encoded data is small when the frequency transform is used whose transform size is any one of the square, the longitudinally long rectangle, and the laterally long rectangle.

On the other hand, only the background B is included and no border is present in a partition other than the lower-right partition in the unit of processing, U. Therefore, when any one of the transform sizes is used, no border is present in the area to which the frequency transform is applied. Therefore, more energy can be concentrated on the transform coefficient when the frequency transform is used whose transform size is a square with which the spatial relation of the pixel values of the prediction residuals can be utilized in a balanced manner in both directions, the horizontal direction (lateral direction) and the vertical direction (longitudinal direction), compared to the case where the frequency transform whose transform size is a longitudinally long rectangle or a laterally long rectangle is used. Therefore, for a square partition, the frequency transform whose transform size is a square is more effective than the frequency transform whose transform size is a laterally long rectangle or a longitudinally long rectangle. Therefore, even when the frequency transform whose transform size is a laterally long rectangle or a longitudinally long rectangle is set to be a prohibited transform for a square partition, the amount of codes of the encoded data is not substantially increased.

<Limitation on Transform Size According to Layer to which Partition Belongs>

Figure 8:
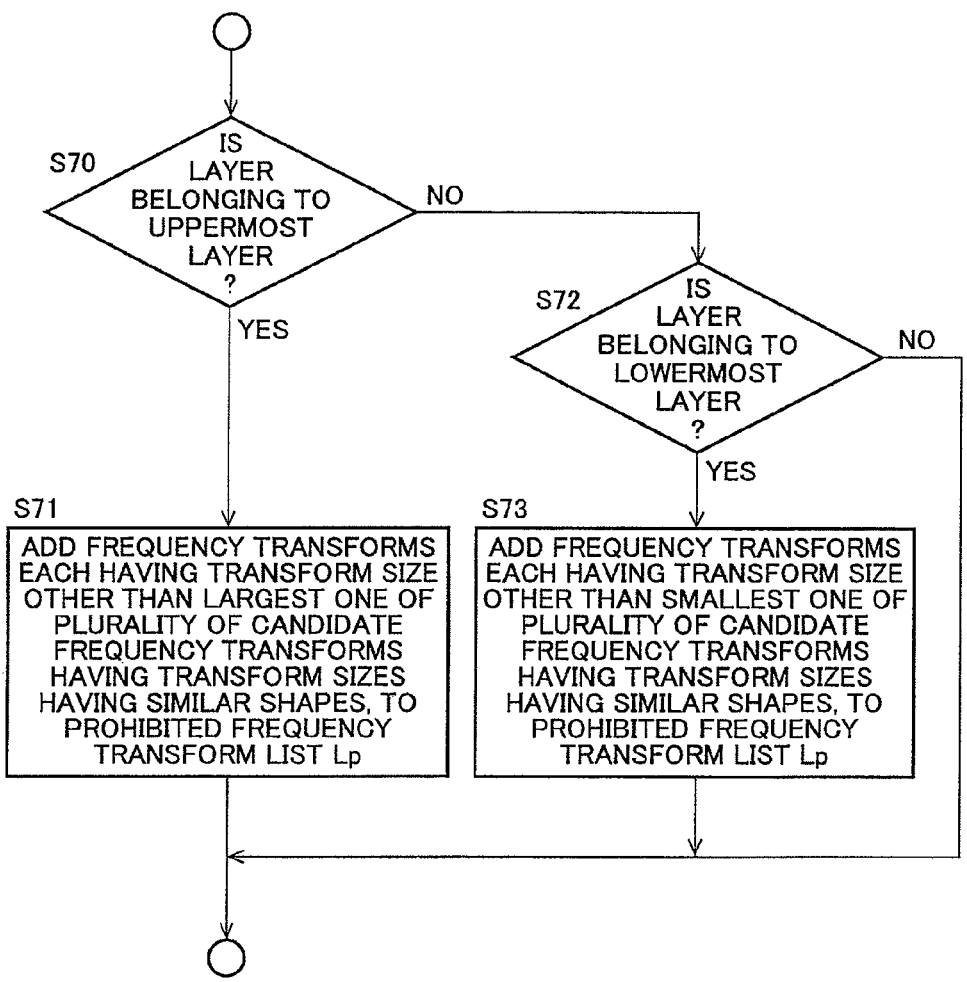
FIG. 8 is a flowchart for explaining yet another example of the producing processing of the prohibited transform list.

A more detailed procedure of step S44 will be described with reference to a flowchart of FIG. 8.

(Step S70) When the layer Lx is the uppermost layer, the procedure is advanced to step S71 and, in other cases, the procedure is advanced to step S72.

(Step S71) Frequency transforms other than the frequency transform having the largest transform size (the 8×8 DCT and the 4×4 DCT) of a plurality of candidate frequency transforms having transform sizes whose shapes (the 16×16 DCT, the 8×8 DCT, and the 4×4 DCT) are added to Lp and the procedure comes to an end.

(Step S72) When the layer Lx is the lowermost layer, the procedure is advanced to step S73 and, in other cases, the procedure comes to an end.

(Step S73) Frequency transforms other than the frequency transform having the smallest transform size (the 16×16 DCT and the 8×8 DCT) of the plurality of candidate frequency transforms having transform sizes whose shapes (the 16×16 DCT, the 8×8 DCT, and the 4×4 DCT) are added to Lp and the procedure comes to an end.

In the case where partitions are expressed by a layer structure, even when some frequency transforms whose transform sizes are relatively small are restricted for a partition that belongs to the uppermost layer, the amount of codes of the encoded data is not substantially increased. This is because, even when a specific transform (for example, the 8×8 DCT or the 4×4 DCT) cannot be selected in the uppermost layer, this transform can be selected in a lower layer. In an area where frequency transforms of small transform sizes are effective, no partition is selected that belongs to the uppermost layer and partitions are selected that are in lower layers and for which frequency transforms of small transform sizes are can be selected and, thereby, any increase of the amount of codes of the encoded data can be suppressed. Especially, based on the fact that the frequency transforms of large transform sizes are effective for a large partition, when a plurality of frequency transforms whose transform sizes are similar in shape are present among the candidate frequency transforms, it is preferable to restrict, frequency transforms of small transform sizes among those frequency transforms in the uppermost layer.

Similarly, in the case where partitions are expressed by a layer structure, even when some frequency transforms whose transform sizes are relatively large are restricted for a partition that belongs to the lowermost layer, the amount of codes of the encoded data is not substantially increased. Especially, based on the fact that the frequency transforms whose transform sizes are small are effective for a small partition, when a plurality of frequency transforms whose transform sizes are similar in shape are present among the candidate frequency transforms, it is preferable to restrict, frequency transforms of large transform sizes among those frequency transforms in the lowermost layer.

<Specific Example of Prohibited Transform List Producing Processing>

Figure 9:
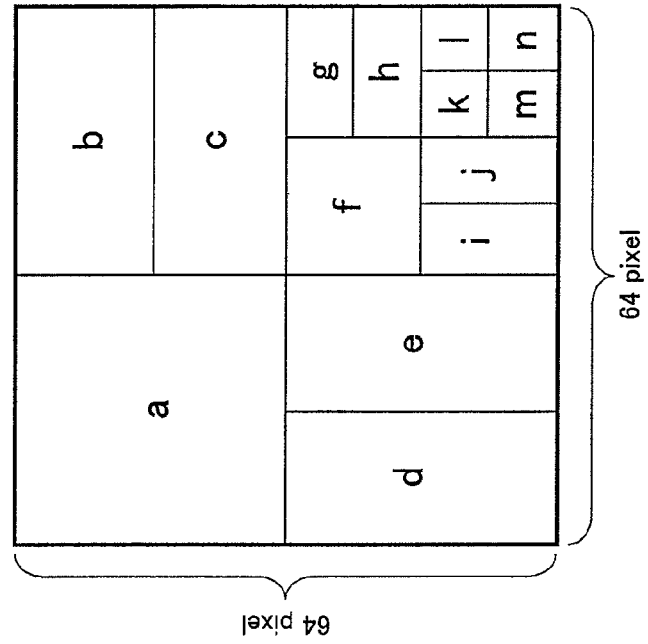
FIG. 9 is a diagram for explaining a specific example of the production procedure of the prohibited transform list.
Figure 10:
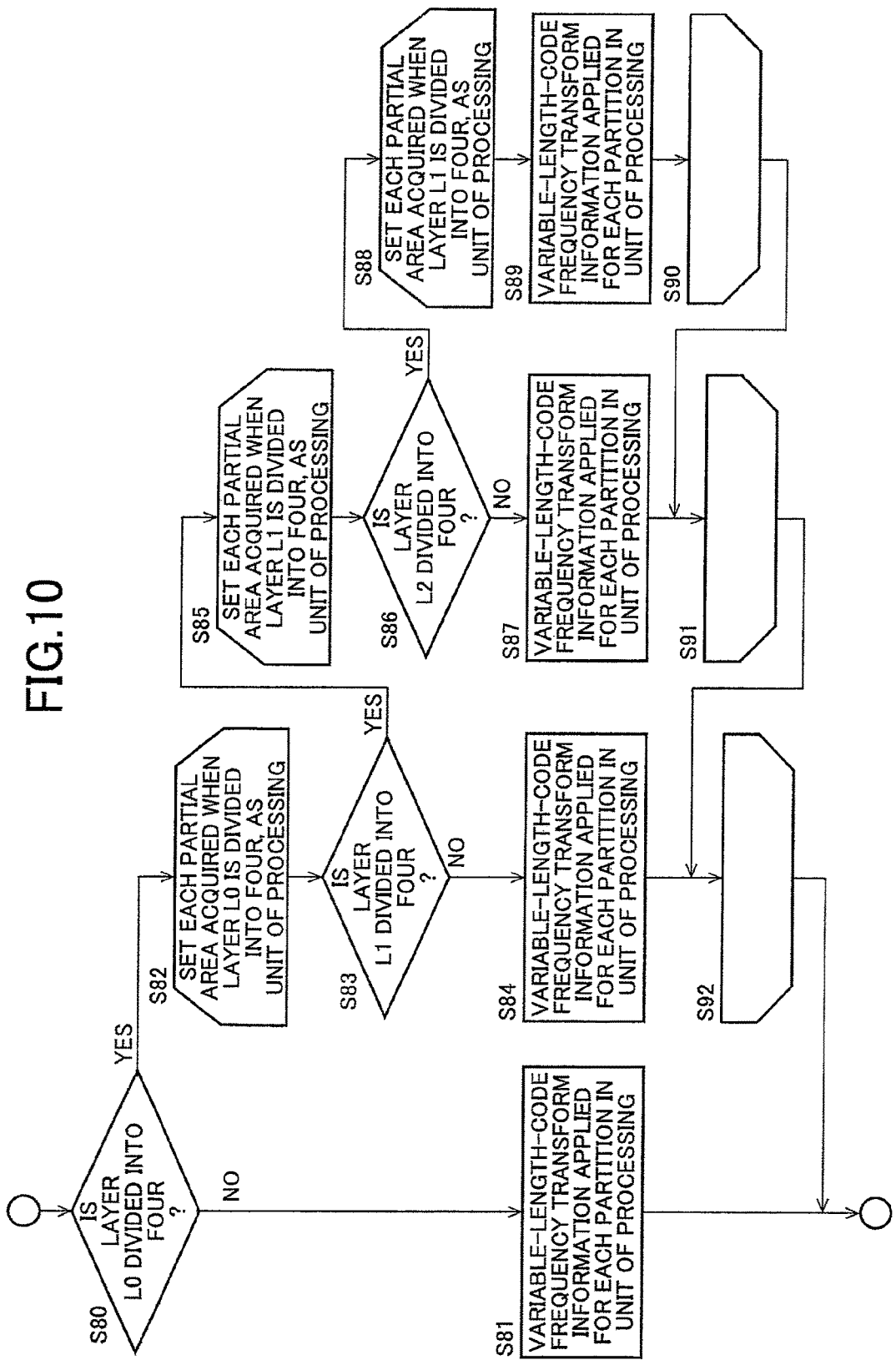
FIG. 10 is a flowchart for explaining an exemplary encoded data producing processing for a transform selection flag.

A specific example of a procedure for producing transform restrictions for a specific partition structure, that is, a prohibited transform list for each partition executed by the transform restriction deriving portion 104 will be introduced with reference to FIG. 9. As depicted in FIG. 9, an expanded MB is divided into four in the layer L0 and, thereafter, the upper-left portion thereof is divided into one (a partition "a") in the layer L1, the upper-right portion thereof is horizontally divided into two (partitions b and c) in the layer L1, the lower-left portion thereof is vertically divided into two (partitions d and e) in the layer L1, and the lower-right portion thereof is divided into four in the layer L1.

As to an area that is divided into four in the layer L1, the upper-left portion thereof is divided into one (partition f) in the layer L2, the upper-right portion thereof is horizontally divided into two (partitions g and h) in the layer L2, the lower-left portion thereof is vertically divided into two (partitions i and j) in the layer L2, and the lower-right portion thereof is divided into four in the layer L2. Each portion acquired by the four-division in the layer L2 is divided into one (partitions k, l, m, and n) in the layer L3. The transform sizes of the frequency transforms that can be selected have, as above, nine kinds of sizes that are 4×4, 8×8, 16×16, 16×1, 1×16, 8×1, 1×8, 16×8, and 8×16.

The partition "a" has a size of 32×32 pixels and belongs to the layer L1. Applying thereto the above procedure for producing the prohibited transform list, frequency transforms: whose transform sizes are 4×4, 8×1, and 1×8 are added to the prohibited transform list at step S51, frequency transform whose transform size is 8×8 is added to the prohibited transform list at step S52, and frequency transforms whose transform sizes are 1×16, 16×1, 16×8, and 8×16 are added to the prohibited transform list at step S67.

The partitions b and c have a size of 32×16 pixels and belong to the layer L1. Applying thereto the above procedure for producing the prohibited transform list, frequency transforms: whose transform sizes are 4×4, 8×1, and 1×8 are added to the prohibited transform list at step S51, frequency transforms whose transform sizes are 4×4, 8×8, and 16×16 are added to the prohibited transform list at step S61, and frequency transforms whose transform sizes are 1×16 and 8×16 are added to the prohibited transform list at step S62.

The partitions d and e have a size of 16×32 pixels and belong to the layer L1. Applying thereto the above procedure for producing the prohibited transform list, frequency transforms: whose transform sizes are 4×4, 8×1, and 1×8 are added to the prohibited transform list at step S51, frequency transforms whose transform sizes are 4×4, 8×8, and 16×16 are added to the prohibited transform list at step S64, and frequency transforms whose transform sizes are 16×1 and 16×8 are added to the prohibited transform list at step S65.

The partition f has a size of 16×16 pixels and belongs to the layer L2. Applying thereto the above procedure for producing the prohibited transform list, frequency transforms: whose transform sizes are 4×4, 8×1, and 1×8 are added to the prohibited transform list at step S51, and frequency transforms whose transform sizes are 16×1, 1×16, 16×8, and 8×16 are added to the prohibited transform list at step S67.

The partitions g and h have a size of 16×8 pixels and belong to the layer L2. Applying thereto the above procedure for producing the prohibited transform list, frequency transforms: whose transform sizes are 16×16, 1×16, and 8×16 are added to the prohibited transform list at step S41, frequency transforms whose transform sizes are 4×4, 8×8, and 16×16 are added to the prohibited transform list at step S61, and frequency transforms whose transform sizes are 1×16 and 8×16 are added to the prohibited transform list at step S62.

The partitions i and j have a size of 8×16 pixels and belong to the layer L2. Applying thereto the above procedure for producing the prohibited transform list, frequency transforms: whose transform sizes are 16×16, 16×1, and 16×8 are added to the prohibited transform list at step S41, frequency transforms whose transform sizes are 4×4, 8×8, and 16×16 are added to the prohibited transform list at step S64, and frequency transforms whose transform sizes are 16×1 and 16×8 are added to the prohibited transform list at step S65.

The partitions k, l, m, and n have a size of 8×8 pixels and belong to the layer L3. Applying thereto the above procedure for producing the prohibited transform list, frequency transforms: whose transform sizes are 16×16, 16×1, 16×8, 1×16, and 8×16 are added to the prohibited transform list at step S41, frequency transforms whose transform sizes are 16×1, 16×8, 1×16, and 8×16 are added to the prohibited transform list at step S67, and frequency transforms whose transform sizes are 8×8 and 16×16 are added to the prohibited transform list at step 5b.

As in the above example, for an expanded MB that has another partition structure, a prohibited transform list can also be produced for each partition in the expanded MB and can be output as a transform restriction.

In the above, it is described that all of steps S42, S43, and S44 are executed in the procedure for producing the prohibited transform list. However, only some of these may be executed. In the detailed procedure of step S42, only either the determination at step S50 or the determination at step S51 may be executed. In the detailed procedure of step S43, concerning the determinations, only some of the determinations executed at steps S60, S63, and S66 may be executed or, concerning the processing executed after each of the determinations, only either step S61 or step S62, and either step S64 or step S65 may be executed. In the detailed procedure of step S44, only either the determination at step S70 or the determination at step S72 may be executed. When such simplification of the procedure is executed, the calculation processing necessary for producing the prohibited transform list can be reduced.

<Frequency Transform Determining Portion 105>

The frequency transform determining portion 105 determines the frequency transform to be applied to each partition in the expanded MB using the transform restriction input thereinto; and outputs the information thereof as a transform selection flag. A procedure is for determining the frequency transform to be applied to the specific partition p as follows:
(Step S120) The prohibited transform list Lp corresponding to the partition p is extracted from the transform restriction.
(Step S121) A list of transform candidate, Cp, is acquired by taking a difference set between the transform preset and the prohibited transform list Lp.
(Step S122) When the list of transform candidate, Cp, is an empty set, the frequency transform is added to the list of transform candidate, Cp, whose transform size is the smallest of the frequency transforms whose transform sizes are squares that are included in the transform preset. This step is necessary to avoid the case where no applicable frequency transform is present when the prohibited transform list coincides with the transform preset. When the prohibited transform list is always produced that does not coincide with the transform preset, this step may be omitted.
(Step S123) The rate distortion cost for a case where each of the frequency transforms included in the list of transform candidate, Cp, is applied is calculated, and the frequency transform that minimizes the rate distortion cost is determined to be the frequency transform to be applied to the partition p.

<Variable-Length-Encoding Portion 108>

The variable-length-encoding portion 108 produces the encoded data that corresponds to the transform coefficient, the prediction parameter, and the transform selection flag in the expanded MB, based on the transform coefficient, the prediction parameter, the transform restriction, and the transform selection flag that are input thereinto, and outputs the encoded data.

The transform coefficient and the prediction parameter are variable-length-encoded in a conventional method and the resultant codes are output. The transform selection flag is variable-length-encoded using the transform restriction and the resultant code is output. A procedure for variable-length-encoding the transform selection flag will be described with reference to a flowchart of FIG. 10.
(Step S80) When the dividing method used for the layer L0 in the expanded MB is other than quartering, the process of step S81 is executed and, in other cases, the processes of steps S82 to S92 are executed.
(Step S81) The information is variable-length-encoded that indicates the frequency transform to be applied to each partition in the unit of processing of the layer L0 (64×64 pixels), and the procedure comes to an end.
(Step S82) Processes of following steps S83 to S92 are executed for each of unit of processing (32×32 pixels each) in the layer L1 that are acquired by dividing the unit of processing in the layer L0 into four.
(Step S83) When the dividing method used for the layer L1 in the current unit of processing (32×32 pixels) is other than quartering, the procedure is advanced to step S84 and, in other cases, the procedure is advanced to step S85.
(Step S84) The information is variable-length-encoded that indicates the frequency transform to be applied to each partition in the current unit of processing (32×32 pixels), and the procedure is advanced to step S92.
(Step S85) Processes of following steps S86 to S91 are applied to each of unit of processing (16×16 pixels each) in the layer L2 that are acquired by dividing the unit of processing in the layer L1 (32×32 pixels) into four.

(Step S86) When the dividing method used in the layer L2 in the current unit of processing (16×16 pixels) is other than quartering, the procedure is advanced to step S87 and, in other cases, the procedure is advanced to step S88.

(Step S87) The information is variable-length-encoded that indicates the frequency transform to be applied to each partition in the current unit of processing (16×16 pixels), and the procedure is advanced to step S91.

(Step S88) Processes of following steps S89 to S90 are executed for each of unit of processing (8×8 pixels each) in the layer L3 that are acquired by dividing the unit of processing in the layer L2 into four.

(Step S89) The information is variable-length-encoded that indicates the frequency transform to be applied to each partition in the current unit of processing (8×8 pixels), and the procedure is advanced to step S90.

(Step S90) When processing of all unit of processing (8×8 pixels each) comes to an end, the procedure is advanced to step S91. When the processing does not come to an end, a next unit of processing (8×8 pixels) is set and the procedure is advanced to step S89.

(Step S91) When processing of all unit of processing (16×16 pixels each) comes to an end, the procedure is advanced to step S92. When the processing does not come to an end, a next unit of processing (16×16 pixels) is set and the procedure is advanced to step S86.

(Step S92) When processing of all unit of processing (32×32 pixels each) comes to an end, the procedure comes to an end. When the processing does not come to an end, a next unit of processing (32×32 pixels) is set and the procedure is advanced to step S83.

The variable-length-encoding is executed according to the following procedure for the transform selection flag that corresponds to the specific partition p.

(Step S130) The prohibited transform list Lp corresponding to the partition p is extracted from the transform restriction.

(Step S131) The list of transform candidate, Cp, is acquired by taking a difference set between the transform preset and the prohibited transform list Lp.

(Step S132) When the list of transform candidate, Cp, is an empty set, the frequency transform is added to the list of transform candidate, Cp, whose transform size is the smallest of the frequency transforms whose transform sizes are squares that are included in the transform preset. The frequency transform added in this step is not limited to the above frequency transforms, and may be the frequency transform whose transform size is smaller than that of another partition p included in the transform preset. However, this frequency transform needs to be the same frequency transform as that used at step S122 of the frequency transform determining portion.

(Step S133) When the number of frequency transforms included in the list of transform candidate, Cp, is only one, the variable-length-encoding processing comes to an end. In this case, even when the information indicating the frequency transform to be applied to the partition p is not included in the encoded data, no problem arises because it can be uniquely identified at the time of decoding the data which frequency transform must be applied.

(Step S134) The frequency transforms included in the list of transform candidate, Cp, are rearranged in predetermined order and correlated to the indexes that increase one by one starting from zero.

(Step S135) The index variable-length-encoded that is correlated with the frequency transform to be applied to the partition p. As a method of variable-length-encoding of the index, for example, a method that takes a bit string of an index value acquired by expressing the index value in the binary using t bits, as the encoded data using the minimal "t" with which the t-th power of two is equal to or larger than s where s is the number of elements of the candidate frequency transform list.

When the number of elements of the candidate frequency transform list becomes smaller, the amount of codes necessary for encoding the index becomes smaller. By setting a prohibited transform for each partition, the amount of codes necessary for encoding the transform selection flag can be reduced. When the number of elements of the candidate frequency transform list is small, the amount of computing can be reduced for the encoding processing to select the frequency transform to be applied.

For the predetermined order at step S134, order can be used according to which, for example, an index smaller than an index attached to a frequency transform whose transform size is small is attached to a frequency transform whose transform size is large, when the transform size of a frequency transform is a square, an index smaller than an index attached to another frequency transform whose transform size is a laterally long rectangle is attached to the frequency transform, and when the transform size of a frequency transform is a laterally long rectangle, an index smaller than an index attached to another frequency transform whose transform size is a longitudinally long rectangle is attached to the frequency transform. In this case, indexes in ascending order tend to be correlated one by one with the 16×16 DCT, the 16×8 DCT, the 8×16 DCT, the 8×8 DCT, the 4×4 DCT, the 16×1 DCT, the 1×16 DCT, the 8×1 DCT, and the 1×8 DCT in this order.

The predetermined order at step S134 may also be descending order of the frequency of selecting each frequency transform, as another example. More specifically, the number of times that each transform in the transform preset is selected as the transform of a partition after starting the encoding processing for the input video is counted, and order is produced such that a smaller index is allocated to a frequency transform that is selected for more times. In this case, a bias is generated also in the frequency of production of the index and, therefore, the amount of codes is reduced that is acquired when the index is variable-length-encoded at step S135. The value of the coefficient of the number of times of the selection may be initialized to a predetermined value such as zero at a proper timing such as the starting time point of encoding of a new frame or the starting time point of encoding a slice that is a set of a predetermined number of expanded MBs. The number of times of selecting a conditional frequency transform such as, for example, the number of times of selecting each frequency transform for each partition size may be counted and used.

Another method may also be used for the variable-length-encoding of the index executed at step S135. For example, various kinds of VLCs, CABACs, etc., specified in H.264/AVC may also be used.

Without variable-length-encoding the index as it is, a flag is encoded that indicates whether the index coincides with an index estimated value and, only when the flag indicates no coincidence, the index may be variable-length-encoded. The frequency transform used for the partition to be processed is estimated using the pieces of information on the expanded MB already encoded (such as the local decoded image, the partition structure, and the motion vector), and an index corresponding to the frequency transform may be determined to be the index estimated value. Especially, it is preferable to derive an index estimated value based on the frequency transform that is applied to a partition in the vicinity of the partition to be processed taking into consideration the spatial correlation of the frequency transform. More specifically, the indexes of the frequency transforms that are applied to the partitions located on the left of, above, and on the upper-right of the partition to be processed are derived, respectively. And a system in which two or more of those indexes coincide with each other, the value of the two or more indexes is determined to be the index estimated value, and in other cases, the smallest value of those indexes is determined to be the index estimated value is preferable.

It is described that a variable-length-encoding is given to the transform selection flags for all the partitions in the procedure for variable-length-encoding of the transform selection flag. However, after imposing a restriction that the frequency transform is commonly applied to the partitions belonging to the same unit of processing of the specific layer Lx, one transform selection flag common to the partitions in the unit of processing may be variable-length-encoded for each unit of processing of the layer Lx. In this case, the degree of freedom of selecting the frequency transform is lowered. However, encoding of any transform selection flag is not necessary for each partition and the transform selection flag only has to be encoded for each unit of processing of the layer Lx and, therefore, the amount of codes can be reduced that are necessary for encoding the transform selection flag. In contrast, a partition may be divided into units that each are not smaller than the frequency transform whose transform size is the largest included in the list of transform candidate, and the transform selection flag may be encoded for this unit.

<Prediction Residual Reconstructing Portion 109>

The prediction residual reconstructing portion 109 reconstructs the prediction residual by applying an inverse frequency transform to the transform coefficient based on the transform coefficient and the transform selection flag that are input thereinto, and outputs the reconstructed prediction residual. When the transform coefficient is quantized, inverse quantization is applied to the transform coefficient prior to the application of the inverse frequency transform.

<Local Decoded Image Producing Portion 110>

The local decoded image producing portion 110 produces a local decoded image based on the predictive image and the prediction residual that are input thereinto, and outputs the local decoded image. Each pixel value of the local decoded image is the sum of the pixel values of the corresponding pixels of the predictive image and the prediction residual. A filter may be applied to the local decoded image with the purpose of reducing the block distortion that is generated on a block border and reducing the quantization errors.

<Operations of Video Encoding Apparatus 10>

Operations of the video encoding apparatus 10 will be described.

(Step S100) The input video externally input into the video encoding apparatus 10 is sequentially input in expanded MBs into the prediction parameter determining portion 102 and the prediction residual producing portion 106. Processes of S101 to S109 as follows are sequentially executed for each of the expanded MBs.

(Step S101) The prediction parameter determining portion 102 determines a prediction parameter for the expanded MB to be processed based on the input video that is input thereinto, and outputs the prediction parameter to the predictive image producing portion 103 and the variable-length-encoding portion 108.

(Step S102) The predictive image producing portion 103 produces the predictive image that approximates an area of the expanded MB to be processed in the input video based on the prediction parameter input thereinto and the local decoded image recorded in the frame memory 101, and outputs the predictive image to the prediction residual producing portion 106 and the local decoded image producing portion 110.

(Step S103) The prediction residual producing portion 106 produces the prediction residual that corresponds to the expanded MB to be processed based on the input video and the predictive image that are input thereinto, and outputs the prediction residual to the frequency transform determining portion 105 and the transform coefficient producing portion 107.

(Step S104) The transform restriction deriving portion 104 derives a restriction on the frequency transform in each partition of the expanded MB to be processed as a transform restriction based on the prediction parameter that is input thereinto, and outputs the transform restriction to the frequency transform determining portion 105 and the variable-length-encoding portion 108.

(Step S105) The frequency transform determining portion 105 determines the frequency transform to be applied to each partition of the expanded MB to be processed based on the transform restriction and the prediction residual that are input thereinto, and outputs the frequency transform as a transform selection flag to the transform coefficient producing portion 107, the variable-length-encoding portion 108, and the prediction residual reconstructing portion 109.

(Step S106) The transform coefficient producing portion 107 applies the frequency transform specified by the transform selection flag input thereinto to the prediction residual input thereinto, thereby, produces the transform coefficient that corresponds to the expanded MB to be processed, and outputs the transform coefficient to the variable-length-encoding portion 108 and the prediction residual reconstructing portion 109.

(Step S107) The prediction residual reconstructing portion 109 applies the inverse frequency transform that corresponds to the frequency transform specified by the transform selection flag input thereinto to the transform coefficient input thereinto, thereby, reconstructs the prediction residual that corresponds to the expanded MB to be processed, and outputs the reconstructed prediction residual to the local decoded image producing portion 110.

(Step S108) The local decoded image producing portion 110 produces the local decoded image based on the prediction residual and the predictive image that are input thereinto, and outputs the local decoded image to the frame memory 101 to record the local decoded image thereon.

(Step S109) The variable-length-encoding portion 108 variable-length-codes the transform coefficient, the prediction parameter, and the transform selection flag that are input thereinto using the transform restriction input thereinto, and externally outputs the resultant data as the encoded data.

According to the above procedure, the video encoding apparatus 10 can code the input video input thereinto, thereby, produce the encoded data, and externally output the encoded data.

<Configuration of Video Decoding Apparatus 20>

The video decoding apparatus 20 will be described that decodes the encoded data that is encoded by the video encoding apparatus 10 and that, thereby, produces the decoded video.

Figure 11:
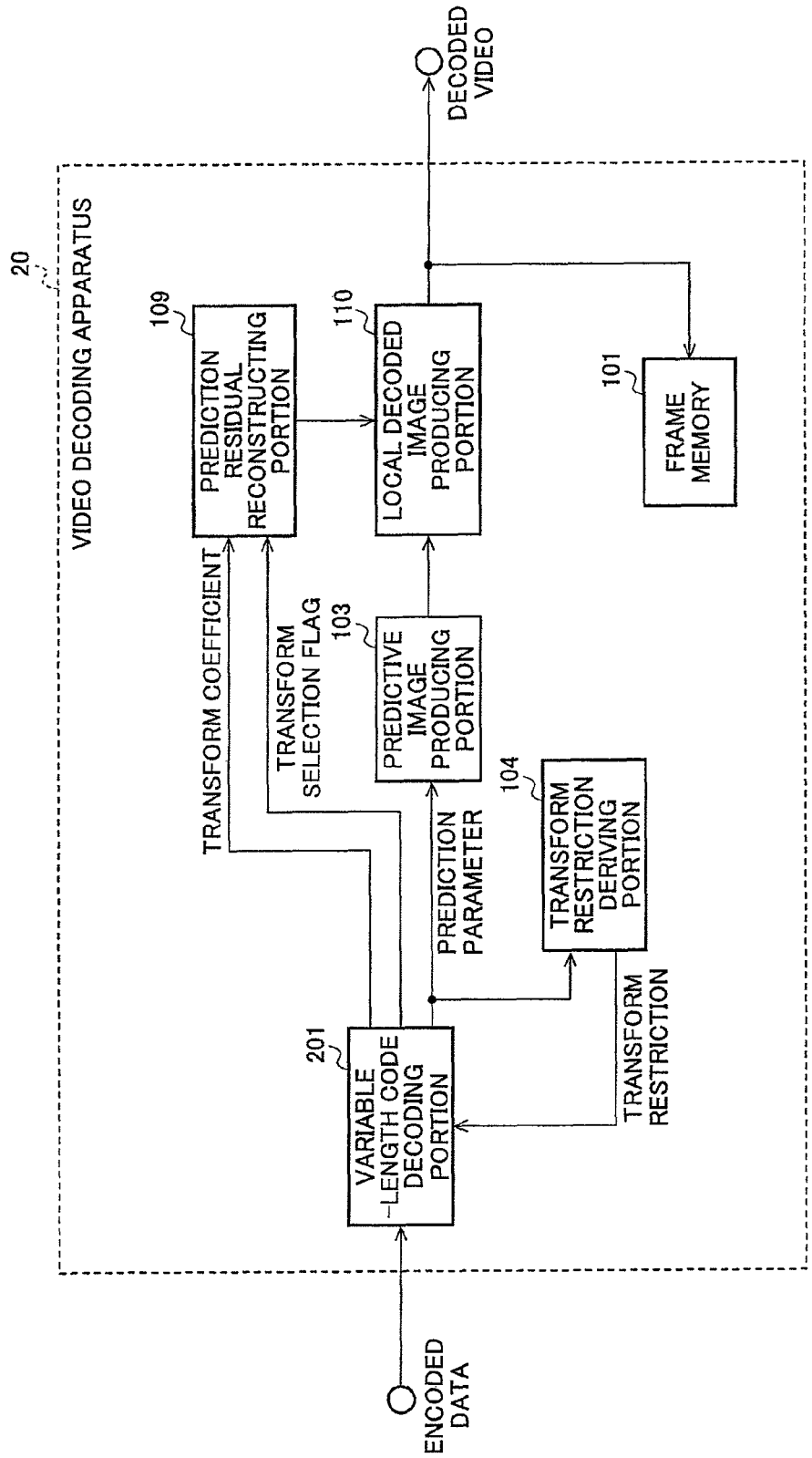
FIG. 11 is a block diagram of an embodiment of a video decoding apparatus of the present invention.

FIG. 11 is a block diagram of the configuration of the image decoding apparatus 20. The video decoding apparatus 20 includes the frame memory 101, the predictive image producing portion 103, the transform restriction deriving portion 104, the prediction residual reconstructing portion 109, the local decoded image producing portion 110, and a variable-length code decoding portion 201.

The variable-length code decoding portion 201 decodes the prediction parameter, the transform selection flag, and the transform coefficient based on the encoded data and the transform restriction that are input thereinto, and outputs the decoded results. More specifically, the prediction parameter is first decoded from the encoded data and the result is output. The transform selection flag is then decoded from the encoded data using the transform restriction and the result is output. The transform coefficient is finally decoded from the encoded data using the transform selection flag and the result is output.

<Operations of Video Decoding Apparatus 20>

Operations of the video decoding apparatus 20 will be described.

(Step S110) The encoded data externally input into the video decoding apparatus 20 is sequentially input into the variable-length code decoding portion 201 in expanded MBs, and processes of S111 to S117 as follows are sequentially executed for the encoded data that corresponds to each expanded MB.

(Step S111) The variable-length code decoding portion 201 decodes the prediction parameter that corresponds to the expanded MB to be processed from the encoded data that is input thereinto, and outputs the prediction parameter to the predictive image producing portion 103 and the transform restriction deriving portion 104.

(Step S112) The transform restriction deriving portion 104 derives a restriction concerning the frequency transform for each partition of the expanded MB to be processed as the transform restriction based on the prediction parameter that is input thereinto, and outputs the transform restriction to the variable-length code decoding portion 201.

(Step S113) The variable-length code decoding portion 201 decodes the transform selection flag that corresponds to the MB to be processed based on the encoded data and the transform restriction that are input thereinto, and outputs the transform selection flag to the prediction residual reconstructing portion 109.

(Step S114) The variable-length code decoding portion 201 decodes the transform coefficient that corresponds to the expanded MB to be processed, based on the decoded data input thereinto and the transform selection flag derived at (step S113), and outputs the transform coefficient to the prediction residual reconstructing portion 109.

(Step S115) The predictive image producing portion 103 produces the predictive image that corresponds to the expanded MB to be processed, based on the prediction parameter input thereinto and the local decoded image recorded in the frame memory 101, and outputs the predictive image to the local decoded image producing portion 110.

(Step S116) The prediction residual reconstructing portion 109 applies the inverse frequency transform corresponding to the frequency transform specified by the transform selection flag input thereinto, to the transform coefficient input thereinto, thereby, reconstructs the prediction residual that corresponds to the expanded MB to be processed, and outputs the prediction residual to the local decoded image producing portion 110.

(Step S117) The local decoded image producing portion 110 produces the local decoded image based on the prediction residual and the predictive image that are input thereinto, outputs the local decoded image to the frame memory 101 to record the local decoded image in the memory 101, and externally outputs the local decoded image as the area on the decoded video that corresponds to the block to be processed.

As above, according to the video decoding apparatus 20, the decoded video can be produced from the encoded data that is produced by the video encoding apparatus 10.

<Appended Item 1: Use of Information on Items Other than Partition Size and Layers to Belong to>

In the description of the video encoding apparatus 10 and the video decoding apparatus 20, the prohibited transform list for each partition in the expanded MB is described to be produced based only on the partition size and the layer to which the partition belongs. However, another piece of information may also be used that can be reproduced for the decoding based on the information included in the encoded data. For example, the motion vector and the reference image index included in the prediction parameter may also be used to derive the prohibited transform list.

A procedure will be described for adding a frequency transform to the prohibited transform list using a motion vector and a reference image index in the specific partition. A motion vector of the partition p is denoted by "mvp" and a reference image index thereof is denoted by "refp". A motion vector of a partition (partition u) located at the leftmost position of the partitions that are adjacent to the top side of the partition p is denoted by "mvu" and a reference image index thereof is denoted by "refu". A motion vector of a partition (partition 1) located at the top end of the partitions that are adjacent to the left side of the partition p is denoted by "mvl" and a reference image index thereof is denoted by "refl".

(Step S140) When all of mvp, mvu, and mvl coincide with each other and all of refp, refu, and refl coincide with each other, the procedure is advanced to step S141. In other cases, the procedure comes to an end.

(Step S141) When two or more frequency transforms that have transform sizes in an analogous relationship in the frequency transform list are present, the frequency transform, whose transform size is the smallest in each combination of the frequency transforms that have the transform sizes in the analogous relationship is added to Lp, and the procedure comes to an end.

The coincidence of the motion vectors among adjacent blocks means that the spatial correlation of the motion vectors is high in the local area in the vicinity of the expanded MB to be encoded. When the spatial correlation of the motion vectors is high, the spatial correlation of the pixel values tends to be also high and, therefore, the increase of the amount of codes of the encoded data is slight even when application is prohibited of the frequency transforms whose transform sizes are small of the frequency transforms that have similar transform sizes.

In the above, it is assumed that the motion vectors and the reference image indexes to be used to derive the prohibited transform list are the motion vectors and the reference image indexes of the partitions that are adjacent to the partition p. However, other motion vectors may be used. For example, motion vectors may be used in expanded MBs adjacent to the expanded MB to which the partition p belongs (the expanded MB to be processed). More specifically, a motion vector of a partition located on the upper-right in the expanded MB adjacent to the left side of the expanded MB to be processed is used as mvl, and a motion vector of a partition located on the lower-left in the expanded MB adjacent to the top side of the expanded MB to be processed is used as mvu. In this case, the same mvl and mvu are used in all the partitions in the expanded MB and, therefore, the processes of steps S140 and S141 can be executed in parallel for each partition.

<Appended Item 2: Timing for Producing Prohibited Transform List>

In the description of the video encoding apparatus 10 and the video decoding apparatus 20, it is described that the transform restriction deriving portion 104 executes the processing of producing the prohibited transform list for each partition of the expanded MB at any time. However, when the addition of the frequency transform to the prohibited transform list is executed based only on the partition size and the layer to which the partition belongs, a prohibited frequency transform list may also be produced in advance at a predetermined timing. In this case, the prohibited transform list produced in advance for each kind of partition needs to be correlated with each partition in the expanded MB by the transform restriction deriving portion 104. The predetermined timing may be the starting time point of the encoding of the input video or a time point immediately after the start of the decoding of the encoded data, or may be a time point immediately after the start of the encoding or the decoding processing of a predetermined encoding unit such as a sequence, a frame, or a slice. The number of times of executing the processing of producing the prohibited transform list can be reduced and, therefore, the amount of processing of encoding and decoding can be reduced.

In contrast, in the case where the frequency transform is added to the prohibited transform list, when the motion vectors and the reference image indexes are used, the processing of producing the prohibited transform list needs to be executed at any time for each expanded MB as described for the video encoding apparatus 10 and the video decoding apparatus 20. In this case, the amount of processing for the encoding and the decoding is increased due to the increase of the number of times of executing the processing of producing the prohibited transform list. However, compared to the case where the producing processing is not executed for each MB, the prohibited transform list can be produced that is more adaptive to the local property of the video by using more information than can be derived from the encoded data.

Second Embodiment

A video encoding apparatus 11 and a video decoding apparatus 21 that are another embodiment of the video encoding apparatus and the video decoding apparatus according to the present invention will be described with reference to FIGS. 12 to 14. In the description of the accompanying drawings, the same components are given the same reference numerals and will not again be described.

The video encoding apparatus 11 and the video decoding apparatus 21 in the embodiment are characterized in that the list of transform candidate is directly derived without producing any prohibited transform list by replacing the transform restriction deriving portion 104 in each of the video encoding apparatus 10 and the video decoding apparatus 20 with a transform candidate deriving portion 111.

The transform restriction deriving portion 104 and the transform candidate deriving portion 111 are collectively referred to as "transform control deriving portion".

Figure 12:
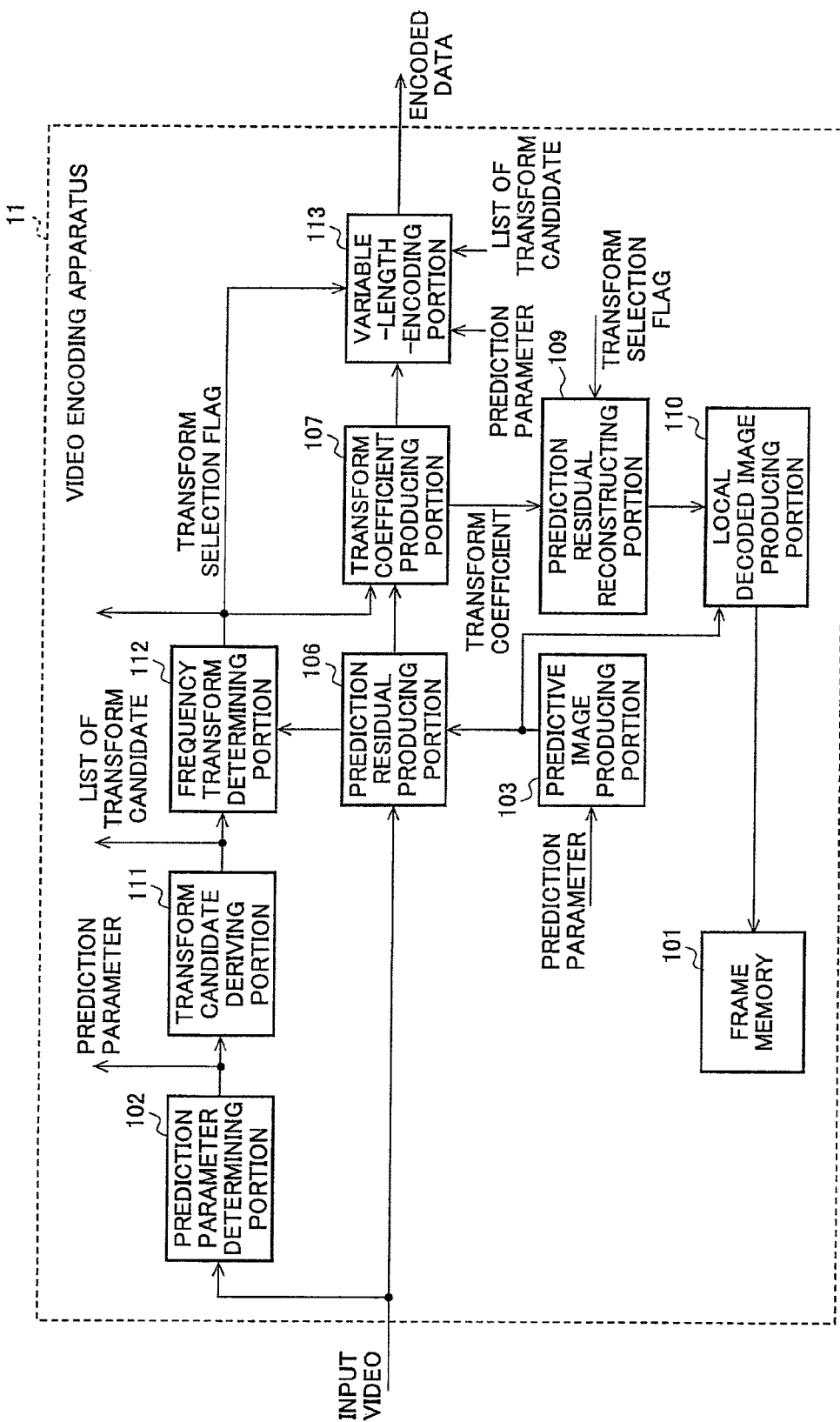
FIG. 12 is a block diagram of another embodiment of the video encoding apparatus of the present invention.
Figure 13:
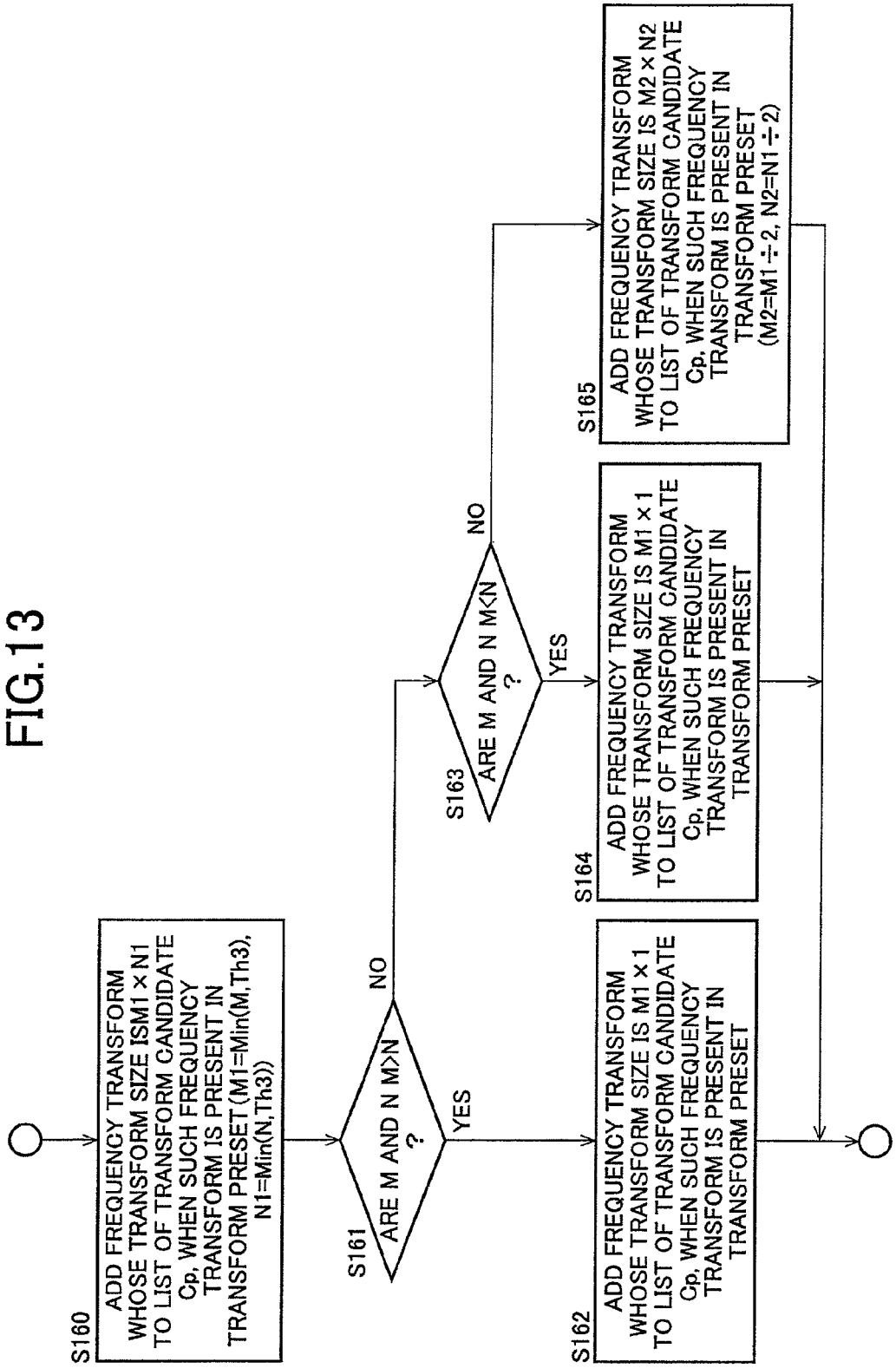
FIG. 13 is a flowchart for explaining an example of producing processing of a list of transform candidate.

FIG. 12 is a block diagram of the configuration of the video encoding apparatus 11. The video encoding apparatus 11 includes the frame memory 101, the prediction parameter determining portion 102, the predictive image producing portion 103, the prediction residual producing portion 106, the transform coefficient producing portion 107, the prediction residual reconstructing portion 109, the local decoded image producing portion 110, the transform candidate deriving portion 111, a frequency transform determining portion 112, and a variable-length-encoding portion 113.

The transform candidate deriving portion 111 outputs, as a list of transform candidate, information on frequency transforms that can be selected for each partition in an expanded MB based on a prediction parameter that is input thereinto. The transform candidate deriving portion ill produces a list of transform candidate for the partition based on partition shape information of each partition determined by the prediction parameter.

The list of transform candidate is correlated with each partition in the expanded MB and specifies a set of frequency transforms that can be selected for each partition of frequency transforms included in a transform preset.

A list of transform candidate, Cp, for a specific partition p is produced according to a procedure as follows. The size of the partition p is assumed to be M×N pixels (M pixels laterally and N pixels longitudinally). The partition p is also assumed to belong to a layer Lx.

(Step S150) The frequency transform is added to Cp, that is determined corresponding to the magnitude relation between M and N.

(Step S151) When Cp is empty, the frequency transform is added to Cp, whose transform size is the largest of those of frequency transforms whose transform sizes are smaller than all of the partition sizes.

A detailed procedure of step S150 will be described with reference to a flowchart of FIG. 13.

(Step S160) Using a predetermined value Th3 (that is hereinafter, for example, Th3=16), the value of Min(M, Th3) is set to be M1 and the value of Min(N, Th3) is set to be N1. Preferably, the value of Th3 is set to be the length of one side of the transform size of the frequency transform whose transform size is the largest square, included in the transform preset. When a frequency transform having a transform size of a transform size M1×N1 is present in the transform preset, this frequency transform is added to the list of transform candidate, Cp, and the procedure is advanced to step S161.

(Step S161) When M is larger than N (when the partition p is a laterally long rectangle), the procedure is advanced to step S162 and, in other cases, the procedure is advanced to step S163.

(Step S162) When a frequency transform having a transform size of a transform size M1×1 is present in the transform preset, this frequency transform is added to the list of transform candidate, Cp, and the procedure comes to an end.

(Step S163) When M is smaller than N (when the partition p is a longitudinally long rectangle), the procedure is advanced to step S164 and, in other cases, the procedure is advanced to step S165.

(Step S164) When a frequency transform having a transform size of a transform size 1×N1 is present in the transform preset, this frequency transform is added to the list of transform candidate, Cp, and the procedure comes to an end.

(Step S165) The value of M1÷2 is set to be M2 and the value of N1÷2 is set to be N2. When a frequency transform having a transform size of a transform size M2×N2 is present in the transform preset, this frequency transform is added to the list of transform candidate, Cp, and the procedure comes to an end. This step is executed when M is equal to N (when the partition p is a square).

The magnitude relation between M and N, and the partition size M×N are pieces of partition shape information.

In the above procedure, when a frequency transform whose transform size has a longitudinal (lateral) length shorter than the height (width) of the partition is present in the transform preset for a laterally long rectangular (longitudinally long rectangular) partition, this frequency transform is added to the list of transform candidate, Cp. A frequency transform whose transform size is a laterally long rectangle (longitudinally long rectangle) is effective for a laterally long rectangular (longitudinally long rectangular) partition as mentioned with reference to FIG. 6 in the description of the procedure for deriving the prohibited transform list by the transform restriction deriving portion 104 of the video encoding apparatus 10. Especially, the cases where a border of an object is present in the transform size can be reduced by using a frequency transform having a transform size whose shorter side length is extremely short compared to its longer side length. Therefore, the concentration effect can be enhanced of the energy on the low-frequency component of the transform coefficient due to the frequency transform.

The frequency transform determining portion 112 determines a frequency transform to be applied to each partition in the expanded MB using the list of transform candidate that is input thereinto, and outputs the frequency transform as a transform selection flag. More specifically, the rate distortion cost for a case where each of the frequency transforms included in the list of transform candidate, Cp, is applied is calculated, and the frequency transform that minimizes the rate distortion cost is determined as the frequency transform to be applied to the partition p.

The variable-length-encoding portion 113 produces the encoded data that corresponds to the transform coefficient, the prediction parameter, and the transform selection flag in the expanded MB, based on the variable-length encoding, the list of transform candidate, and the transform selection flag in addition to the transform coefficient and the prediction parameter that are input thereinto, and outputs the encoded data.

The procedure for variable-length-encoding the transform selection flag for each partition in the expanded MB is as described at steps S80 to S92 (FIG. 10) by the variable-length-encoding portion 108 of the video encoding apparatus 10. Steps S133 to S135 by the variable-length-encoding portion 108 is applied as a detailed procedure for variable-length-encoding the transform selection flag for a specific partition.

Operations of the video encoding apparatus 11 will be described.

(Step S170) The input video externally input into the video encoding apparatus 11 is sequentially input in expanded MBs into the prediction parameter determining portion 102 and the prediction residual producing portion 106. Processes of S171 to S179 as follows are sequentially executed for each of the expanded MBs.

(Step S171) The prediction parameter determining portion 102 determines the prediction parameter for the expanded MB to be processed based on the input video that is input thereinto, and outputs the prediction parameter to the predictive image producing portion 103 and the variable-length-encoding portion 113.

(Step S172) The predictive image producing portion 103 produces the predictive image that approximates an area of the expanded MB to be processed in the input video based on the prediction parameter input thereinto and the local decoded image recorded in the frame memory 101, and outputs the predictive image to the prediction residual producing portion 106 and the local decoded image producing portion 110.

(Step S173) The prediction residual producing portion 106 produces the prediction residual that corresponds to the expanded MB to be processed, based on the input video and the predictive image that are input thereinto, and outputs the prediction residual to the frequency transform determining portion 112 and the transform coefficient producing portion 107.

(Step S174) The transform candidate deriving portion 111 derives the restriction concerning the frequency transform for each partition in the expanded MB to be processed, based on the prediction parameter that is input thereinto, and outputs the restriction to the frequency transform determining portion 112 and the variable-length-encoding portion 113.

(Step S175) The frequency transform determining portion 112 determines the frequency transform to be applied to each partition of the expanded MB to be processed, based on the transform restriction and the prediction residual that are input thereinto, and outputs the frequency transform as a transform selection flag to the transform coefficient producing portion 107, the variable-length-encoding portion 113, and the prediction residual reconstructing portion 109.

(Step S176) The transform coefficient producing portion 107 applies a frequency transform specified by the transform selection flag input thereinto to the prediction residual input thereinto, thereby, produces a transform coefficient that corresponds to the expanded MB to be processed, and outputs the transform coefficient to the variable-length-encoding portion 108 and the prediction residual reconstructing portion 109.

(Step S177) The prediction residual reconstructing portion 109 applies an inverse frequency transform that corresponds to the frequency transform specified by the transform selection flag input thereinto to the transform coefficient input thereinto, thereby, reconstructs the prediction residual that corresponds to the expanded MB to be processed, and outputs the prediction residual to the local decoded image producing portion 110.

(Step S178) The local decoded image producing portion 110 produces the local decoded image based on the prediction residual and the predictive image that are input thereinto, and outputs the local decoded image to the frame memory 101 to record the local decoded image in the frame memory 101.

(Step S179) The variable-length-encoding portion 113 variable-length-codes the transform coefficient, the prediction parameter, and the transform selection flag that are input thereinto, using the transform restriction input thereinto, and externally outputs the encoding results as the encoded data.

According to the above procedure, the video encoding apparatus 11 can code the input video input thereinto, produce the encoded data, and externally output the encoded data.

<Another Example of Method of Producing List of Transform Candidate>

An example of the method of producing the list of transform candidate is described in the description concerning the transform candidate deriving portion 111. However, the list of transform candidate may be produced using another method. For example, when two frequency transforms DCTa and DCTb that are in an analogous relationship (however, the transform size of DCTa is larger than the transform size of DCTb) are included in the transform preset, a method of producing the list of transform candidate is effective which DCTa is added and DCTb is not added to the list of transform candidate for a partition included in an upper layer and DCTb is added to the list of transform candidate for a partition included in a lower layer. More specifically, when a 16×16 DCT and a 8×8 DCT are included in the transform preset, at least the 16×16 DCT is added and the 8×8 DCT is not added to the list of transform candidate for a partition included in the layer L0 whose unit of processing is 64×64 pixels; and at least the 8×8 DCT is added to the list of transform candidate for a partition included in the layer L1 whose unit of processing is 32×32 pixels.

Even in the case where the specific frequency transform DCTb (for example, a 8×8 DCT) can not be selected for a partition included in the specific layer Lx, when DCTb can be selected for a partition belonging to the layer Ly that is lower than the layer Lx, an increase of the amount of codes of the encoded data can be suppressed, not by selecting any partition belonging to the upper layer Lx but by selecting the partition belonging to the lower layer Ly that allows the DCTb to be selected in an area that DCTb is effective. Especially, based on the fact that a frequency transform whose transform size is large is effective for a large partition, it is effective that, for a partition belonging to the upper layer Lx, DCTa having a larger transform size (for example, a 16×16 DCT) is allowed to be selected instead of prohibiting DCTb from being selected and, on the other hand, for a partition belonging to the lower layer Ly, DCTb is allowed to be selected.

<Configuration of Video Decoding Apparatus 21>

The video decoding apparatus 21 will be described that produces a decoded video by decoding the encoded data encoded by the video encoding apparatus 11.

Figure 14:
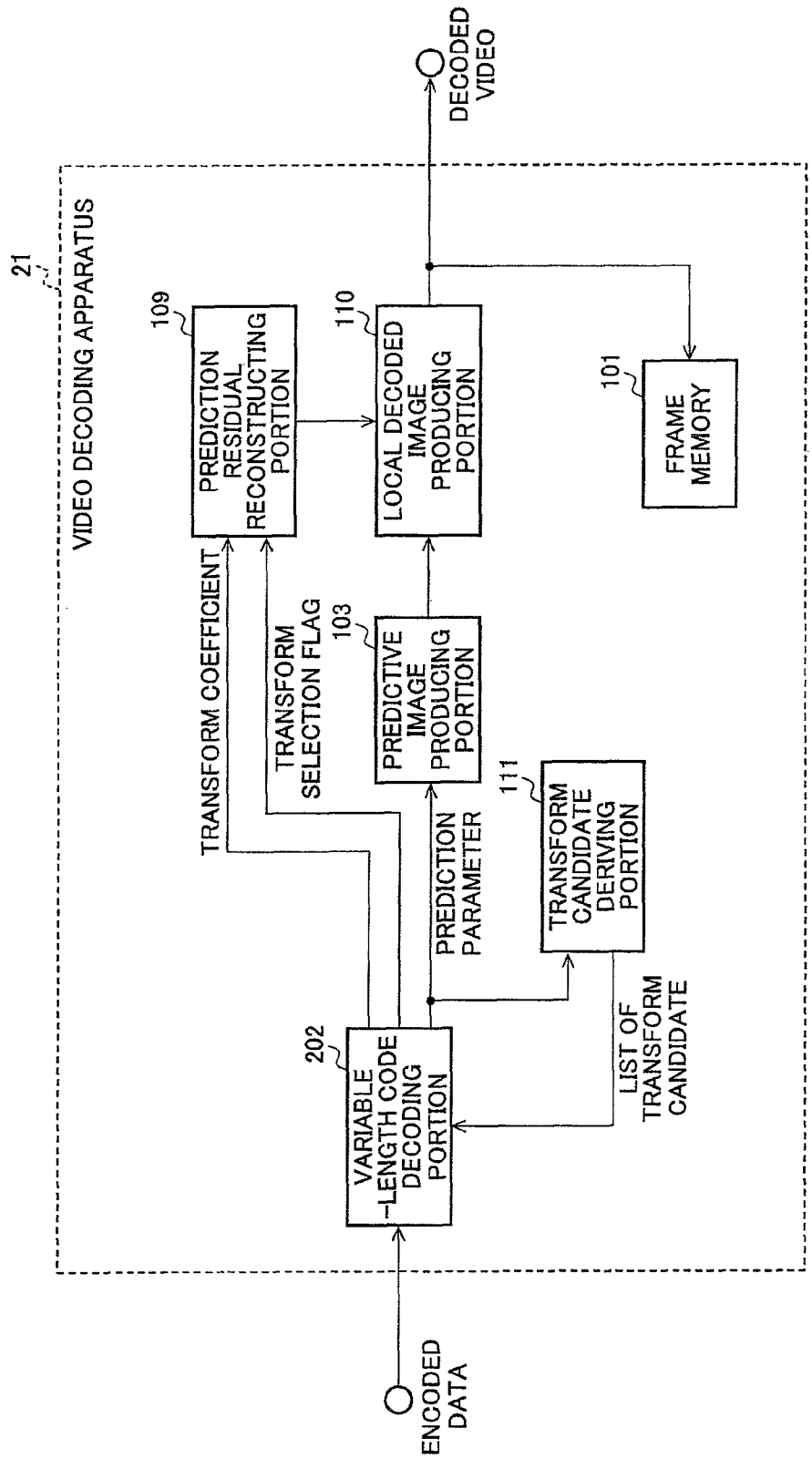
FIG. 14 is a block diagram of another embodiment of the video decoding apparatus of the present invention.

FIG. 14 is a block diagram of the configuration of the image decoding apparatus 21. The video decoding apparatus 20 includes the frame memory 101, the predictive image producing portion 103, the prediction residual reconstructing portion 109, the local decoded image producing portion 110, the transform candidate deriving portion 111, and a variable-length code decoding portion 202.

The variable-length code decoding portion 202 decodes the prediction parameter, the transform selection flag, and the transform coefficient based on the encoded data and the list of transform candidate that are input thereinto, and outputs the decoding results. More specifically, the variable-length code decoding portion 202 first decodes the prediction parameter from the encoded data and outputs the prediction parameter, then decodes the transform selection flag from the encoded data using the list of transform candidate and outputs the transform selection flag, and finally decodes the transform coefficient from the encoded data using the transform selection flag and outputs the transform coefficient. When the transform selection flag is decoded, it is necessary to know how many bits are used to encode the transform selection flag. For that the information of the elements included in the list of transform candidate is not necessarily needed but it is needed to only know the number of elements included in the list of transform candidate. In this case, a signal input into the variable-length code decoding portion 202 and a signal used to decode the transform selection flag may be only a signal concerning the number of elements included in the list of transform candidate of the list of transform candidate.

<Operations of Video Decoding Apparatus 21>

Operations of the video decoding apparatus 21 will be described.

(Step S180) The encoded data externally input into the video decoding apparatus 20 is sequentially input into the variable-length code decoding portion 201 expanded MB by expanded MB, and following processing of steps S181 to S187 is sequentially executed for the encoded data that corresponds to each expanded MB.

(Step S181) The variable-length code decoding portion 202 decodes the prediction parameter that corresponds to the expanded MB to be processed from the encoded data input thereinto, and outputs the prediction parameter to the predictive image producing portion 103 and the transform candidate deriving portion 111.

(Step S182) The transform candidate deriving portion 111 derives the list of transform candidate for each partition of the expanded MB to be processed based on the prediction parameter input thereinto, and outputs the list of transform candidate to the variable-length code decoding portion 202.

(Step S183) The variable-length code decoding portion 202 decodes the transform selection flag that corresponds to the MB to be processed based on the encoded data and the transform restriction that are input thereinto, and outputs the transform selection flag to the prediction residual reconstructing portion 109.

(Step S184) The variable-length code decoding portion 202 decodes the transform coefficient that corresponds to the expanded MB to be processed based on the encoded data input thereinto and the transform selection flag derived at (step S183), and outputs the transform coefficient to the prediction residual reconstructing portion 109.

(Step S185) The predictive image producing portion 103 produces the predictive image that corresponds to the expanded MB to be processed based on the prediction parameter input thereinto and the local decoded image recorded in the frame memory 101, and outputs the predictive image to the local decoded image producing portion 110.

(Step S186) The prediction residual reconstructing portion 109 applies the inverse frequency transform that corresponds to the frequency transform specified by the transform selection flag input thereinto, to the transform coefficient input thereinto, thereby, reconstructs the prediction residual that corresponds to the expanded MB to be processed, and outputs the prediction residual to the local decoded image producing portion 110.

(Step S187) The local decoded image producing portion 110 produces the local decoded image based on the prediction residual and the predictive image that are input thereinto, outputs the local decoded image to the frame memory 101 to record the local decoded image in the frame memory 101, and externally outputs the local decoded image as the area on the decoded video that corresponds to the block to be processed.

<Conclusion for Decoder>

As above, according to the video decoding apparatus 21, the decoded video can be produced from the encoded data that is produced by the video encoding apparatus 11.

Third Embodiment

A video encoding apparatus 30 and a video decoding apparatus 40 that are yet another embodiment of the video encoding apparatus and the video decoding apparatus according to the present invention will be described with reference to FIGS. 15 to 16. In the description of the accompanying drawings, the same reference numerals are given to the same components and those components will not again be described. It is assumed that the partition structure and the transform preset that are available for the video encoding apparatus 30 and the video decoding apparatus 40 are the same as those that are used for the video encoding apparatus 11 and the video decoding apparatus 21.

The video encoding apparatus 30 and the video decoding apparatus 40 in the embodiment are different from the video encoding apparatus 11 and the video decoding apparatus 21 in that the video encoding apparatus 30 and the video decoding apparatus 40 include a function that adaptively changes the method of deriving the list of transform candidate by the transform candidate deriving portion matching the property of the video in a predetermined unit that is larger than an MB such as a scene, a frame, or a slice of the video.

Figure 15:
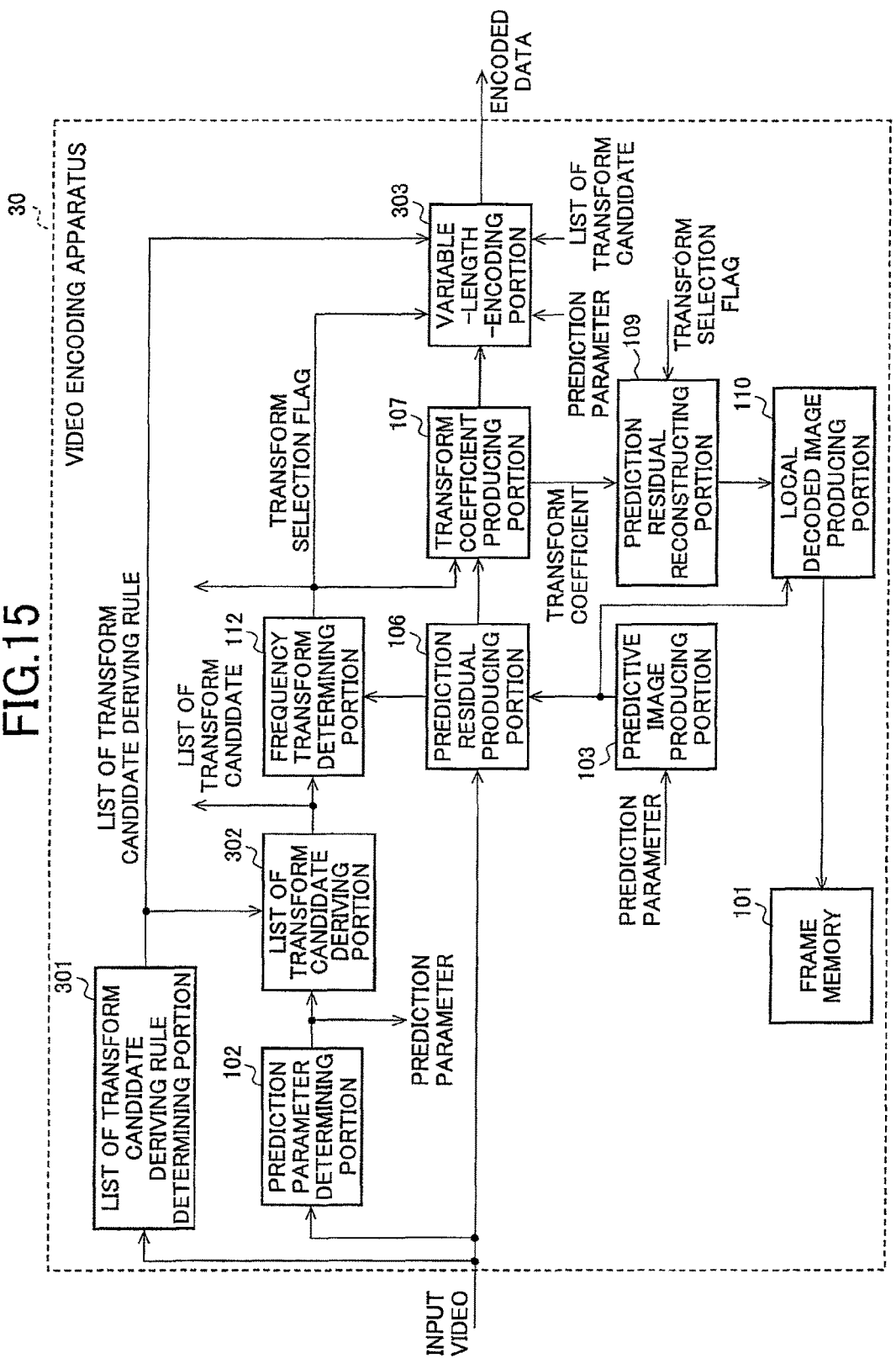
FIG. 15 is a block diagram of yet another embodiment of the video encoding apparatus of the present invention.

FIG. 15 is a block diagram of the configuration of the video encoding apparatus 30. The video encoding apparatus 30 includes the frame memory 101, the prediction parameter determining portion 102, the predictive image producing portion 103, the prediction residual producing portion 106, the transform coefficient producing portion 107, the prediction residual reconstructing portion 109, the local decoded image producing portion 110, the frequency transform determining portion 112, a list of transform candidate deriving rule determining portion 301, a transform candidate deriving portion 302, and a variable-length-encoding portion 303.

The list of transform candidate deriving rule determining portion 301 produces a list of transform candidate deriving rule that specifies or updates the method of deriving the list of transform candidate executed by the transform candidate deriving portion based on the input video that is input in predetermined units that are larger than an MB such as a scene, a frame, or a slice. Hereinafter, for the simplicity of the description, the list of transform candidate deriving rule will be described assuming that this rule is produced for each frame.

(Definition of List of Transform Candidate Deriving Rule)

The list of transform candidate deriving rule is defined as a combination of the basic rules that are listed as follows.

Basic Rule 1: This rule specifies to add a predetermined frequency transform B in the transform preset to the list of transform candidate for a predetermined partition A. Hereinafter, the basic rule 1 is described in a form of [permission, partition A, frequency transform B]. For example, [permission, 64×64, T16×16] indicates to add a frequency transform of T16×16 to the list of transform candidate for a 64×64-partition.

Basic Rule 2: This rule specifies to prohibit the predetermined frequency transform B in the transform preset from being included in the list of transform candidate for the predetermined partition A. Hereinafter, the basic rule 2 is described in a form of [prohibition, partition A, frequency transform B]. For example, [prohibition, 64×64, T4×4] indicates to prohibit T4×4 for a partition having a size of 64×64 and not to include T4×4 in the list of transform candidate.

Basic Rule 3: This rule specifies to replace the frequency transform B in the list of transform candidate with another frequency transform C when the predetermined frequency transform B in the transform preset is included in the list of transform candidate for the predetermined partition A. Hereinafter, the basic rule 3 is described in a form of [replacement, partition A, frequency transform B, frequency transform C]. For example, [replacement, 64×32, T4×4, T16×1] indicates to exclude, T4×4 from the list of transform candidate and, instead, to add T16×1 to the list of transform candidate when T4×4 is included in the list of transform candidate for a partition having a size of 64×32.

The list of transform candidate deriving rule includes a plurality of basic rules and each of the basic rules is classified into any one of the basic rules 1 to 3.

In the list of transform candidate deriving rule, in addition to the basic rules, or instead of the basic rules, a complex rule expressed by a combination of the basic rules may be included. Examples of some of the complex rules will be listed.

Complex Rule 1: A specific transform is prohibited for a partition that belongs to a specific layer. For example, a rule of prohibiting any transform whose size is T8×8 or smaller in the L0 layer corresponds to this complex rule 1. The complex rule (R1) can be expressed as a set of the basic rules as follows.

R1={[prohibition, P, T]: ("P" is a partition that belongs to the L0 layer)∧("T" is a frequency transform of T8×8 or smaller)}

A rule also corresponds to this complex rule 1, of prohibiting any frequency transform whose size is small in the frequency transforms in an analogous relationship in a layer that is upper than a predetermined layer, more specifically, a rule of prohibiting T8×8 and T4×4 of the transforms of T16×16, T8×8, and T4×4 that are in an analogous relationship in a layer that is upper than the layer L1.

Complex Rule 2: A specific transform A is replaced with a specific transform B for a partition having a specific shape. For example, a rule of replacing a rectangular frequency transform with a specific square frequency transform (for example, T4×4) for a square partition corresponds to this complex rule 2. The complex rule (R2) can be expressed as a set of the basic rules as follows:

R2={[replacement, P, T, T4×4]: (P∈square partitions)∧(T∈rectangular frequency transforms)}

A rule of replacing a square frequency transform with a laterally long rectangular frequency transform for a laterally long rectangular partition also corresponds to this complex rule 2.

(Procedure for Determining List of Transform Candidate Deriving Rule)

Candidate rules having, as its elements, the basic rules and the complex rules are specified in advance before the start of the encoding processing, and the list of transform candidate deriving rule is set to be empty. The rate distortion cost is calculated for a case where the encoding processing is executed applying each of the basic rules or each of the complex rules included in the candidate rules to each frame that is input. A rate distortion cost C1 is also calculated for a case where all the candidate rules are not applied. In comparison between a rate distortion cost C2 calculated for a case where each of the basic rules or each of the complex rules is applied, and the cost C1, when the cost C2 is smaller than the cost C1, it is determined that the basic rule or the complex rule is applied and included in the list of transform candidate deriving rule.

According to the above procedure, only the basic rule or the complex rule of predetermined candidate rules which can reduce the rate distortion cost by applying when encoding a frame, is added to the list of transform candidate deriving rule.

The transform candidate deriving portion 302 outputs, the information on frequency transforms that can be selected in each partition in the expanded MB as a list of transform candidate based on the prediction parameter that is input and the list of transform candidate deriving rule. The list of transform candidate is correlated with each partition in the expanded MB and specifies a set of the frequency transforms that can be selected in each partition of the frequency transforms included in the transform preset. At this step, the list of transform candidate deriving rule that is input is also used for the processing of deriving the list of transform candidate.

A procedure is as follows for producing the list of transform candidate, Cp, for the specific partition p based on the list of transform candidate deriving rule that is input. It is assumed that the size of the partition p is M×N pixels (laterally, M pixels and, longitudinally, N pixels).

(Step S200) When the complex rules are included in the list of transform candidate deriving rule, each of the complex rules is disassembled into the basic rules and these basic rules are added to the list of transform candidate deriving rule.

(Step S201) Processing of step S202 is executed for all the basic rules belonging to the basic rule 1 that are included in the list of transform candidate.

(Step S202) The basic rule 1 to be processed is expressed as [permission, P1, T1]. When the shape of the partition p and P1 coincide with each other, a frequency transform T1 is added to the list of transform candidate.

(Step S203) Processing of step S204 is executed for all the basic rules belonging to the basic rule 2 that are included in the list of transform candidate.

(Step S204) The basic rule 2 to be processed is expressed as [prohibition, P2, T2]. When the shape of the partition p and P2 coincide with each other and a frequency transform T2 is present in the list of transform candidate, the frequency transform T2 is removed from the list of transform candidate.

(Step S205) Processing of step S206 is executed for all the basic rules belonging to the basic rule 3 that are included in the list of transform candidate.

(Step S206) The basic rule 2 to be processed is expressed as [replacement, P3, T3, T4]. When the shape of the partition p and P3 coincide with each other and a frequency transform T3 is present in the list of transform candidate, the frequency transform T3 is replaced with a frequency transform T4.

According to the above procedure, the transform candidate deriving portion 302 can derive the list of transform candidate according to the list of transform candidate deriving rule input thereinto.

The variable-length-encoding portion 303 produces encoded data that corresponds respectively to the transform coefficient, the prediction parameter, the list of transform candidate, the transform selection flag, and the list of transform candidate deriving rule that are input thereinto, and outputs the encoded data.

Details of the processing of producing the encoded data corresponding to the list of transform candidate deriving rule will be described. The encoded data is produced by variable-length-encoding each of the basic rules or the complex rules that are included in the list of transform candidate deriving rule. In the variable-length-encoding of the basic rule, the information is encoded first that indicates which of the basic rules 1 to 3 the basic rule to be encoded is classified into, and then information is encoded that indicates the partition to which the basic rule is applied. Finally, information that indicates the permitted frequency transform is encoded in the case of the basic rule 1, information that indicates the prohibited frequency transform is encoded in the case of the basic rule 2, and information that indicates the kind of each frequency transform before and after the replacement is encoded in the case of the basic rule 3. When which basic rule can be included in the list of transform candidate deriving list is determined in advance, the amount of codes can be reduced by determining the information indicating whether the basic rule is applied to be the encoded data instead of variable-length-encoding the basic rules according to the above method. When it is determined in advance that a specific basic rule is always applied it is not necessary to variable-length-code the basic rule.

A complex rule is encoded after the complex rule is disassembled into the basic rules. When which complex rule can be included in the list of transform candidate deriving list is determined in advance, the amount of codes can be reduced by determining the information indicating whether the complex rule is applied to be the encoded data. For example, it is possible to encode where apply or not a complex rule that prohibits T4×4 and T8×8 in a partition that is larger than 32×32 as a flag of one bit.

It may be possible to encode the information indicating with or without application for each of the basic rules included in a rule group which is specified by collectively handling the specific basic rules or the specific complex rules, to encode a flag indicating where or not estimating with or without application for all the basic rules included in the rule group. More specifically, when complex rules indicating whether T16×16, T8×8, and T4×4 are applied in the layer L3 are respectively expressed as "enable_t16×16_L3", "enable_t16×16_L3" and "enable_t16×16_L3", a rule group "enable_L3" is produced by collectively handling these three complex rules. In the encoding, whether enable_L3 is applied is encoded by one bit first. When enable_L3 is applied, whether each complex rule included in the rule group is applied is encoded by one bit. When enable_L3 is not applied, whether each complex rule is applied is estimated according to a predetermined method.

The basic rules and the complex rules may collectively be encoded without variable-length-encoding those rules one by one. For example, only when a flag is encoded that indicates whether all the basic rules are not applied or at least one basic rule is applied and this flag indicates that at least one basic rule is applied, the information may be encoded that indicates whether each of the basic rules is applied. In addition, a flag may be encoded that indicates whether the list of transform candidate deriving rule applied in a previous frame is continuously applied and, only when this list of transform candidate deriving rule is not continuously applied, the list of transform candidate deriving rule may be encoded.

Operations of the video encoding apparatus 30 will be described.

(Step S210) The input video externally input into the video encoding apparatus 30 is input into the list of transform candidate deriving rule determining portion 301 frame by frame, and is sequentially input into the prediction parameter determining portion 102 and the prediction residual producing portion 106 expanded MB by expanded MB. Processes of steps S211 to S212 are executed for each frame and processes of steps S213 to S221 are executed for each expanded MB.

(Step S211) The list of transform candidate deriving rule determining portion 301 produces the list of transform candidate deriving rule based on the frame input thereinto, and outputs the list of transform candidate deriving rule to the transform candidate deriving portion 302 and the variable-length-encoding portion 303.

(Step S212) The variable-length-encoding portion 303 produces the corresponding encoded data based on the list of transform candidate deriving rule input thereinto, and externally outputs the corresponding encoded data.

(Step S213) The prediction parameter determining portion 102 determines the prediction parameter for the expanded MB to be processed based on the input video input thereinto, and outputs the prediction parameter to the predictive image producing portion 103, the transform candidate deriving portion 302, and the variable-length-encoding portion 303.

(Step S214) The predictive image producing portion 103 produces the predictive image that approximates an area of the expanded MB to be processed in the input video, based on the prediction parameter input thereinto and the local decoded image recorded in the frame memory 101, and outputs the predictive image to the prediction residual producing portion 106 and the local decoded image producing portion 110.

(Step S215) The prediction residual producing portion 106 produces the prediction residual that corresponds to the expanded MB to be processed based on the input video and the predictive image that are input thereinto, and outputs the prediction residual to the frequency transform determining portion 112 and the transform coefficient producing portion 107.

(Step S216) The transform candidate deriving portion 302 derives the restriction concerning the frequency transform for each partition of the expanded MB to be processed based on the prediction parameter and the list of transform candidate deriving rule that are input thereinto, and outputs the restriction to the frequency transform determining portion 112 and the variable-length-encoding portion 303.

(Step S217) The frequency transform determining portion 112 determines the frequency transform to be applied to each partition of the expanded MB to be processed based on the transform restriction and the prediction residual that are input thereinto, and outputs the frequency transform as the transform selection flag to the transform coefficient producing portion 107, the variable-length-encoding portion 303, and the prediction residual reconstructing portion 109.

(Step S218) The transform coefficient producing portion 107 applies the frequency transform specified by the transform selection flag input thereinto to the prediction residual input thereinto, thereby, produces the transform coefficient that corresponds to the expanded MB to be processed, and outputs the transform coefficient to the variable-length-encoding portion 108 and the prediction residual reconstructing portion 109.

(Step S219) The prediction residual reconstructing portion 109 applies the inverse frequency transform that corresponds to the frequency transform specified by the transform selection flag input thereinto, to the transform coefficient input thereinto, thereby, reconstructs the prediction residual that corresponds to the expanded MB to be processed, and outputs the prediction residual to the local decoded image producing portion 110.

(Step S220) The local decoded image producing portion 110 produces the local decoded image based on the prediction residual and the predictive image that are input thereinto, and outputs the local decoded image to the frame memory 101 to record the local decoded image in the frame memory 101.

(Step S221) The variable-length-encoding portion 303 variable-length-codes the transform coefficient, the prediction parameter, and the transform selection flag that are input thereinto, using the transform restriction input thereinto, and externally outputs the resultant data as the encoded data.

According to the above procedure, the video encoding apparatus 30 can code the input video that is input thereinto, thereby, produce the encoded data, and externally output the encoded data.

<Configuration of Video Decoding Apparatus 40>

The video decoding apparatus 40 will be described that decodes the encoded data that is encoded by the video encoding apparatus 30 and that, thereby, produces the decoded video.

Figure 16:
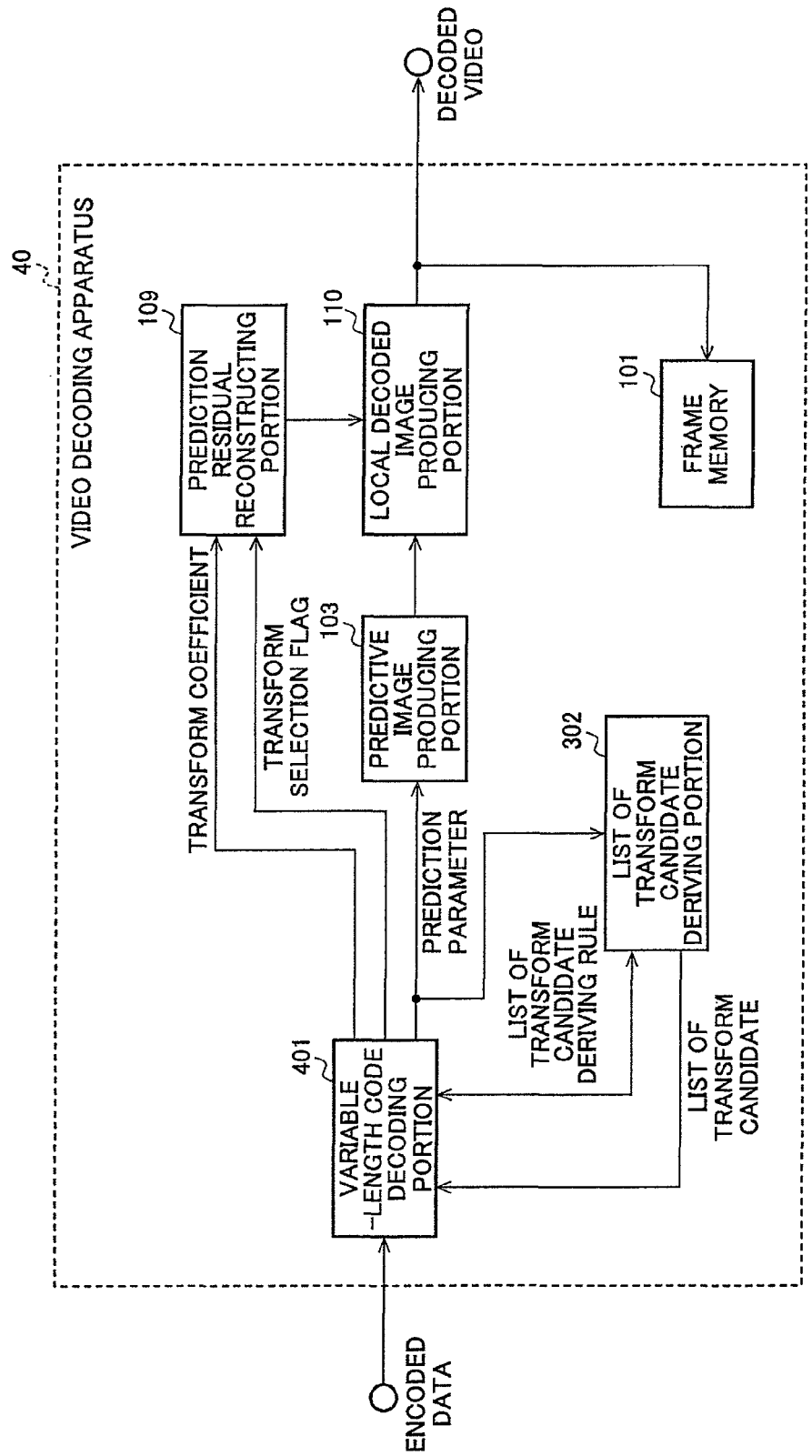
FIG. 16 is a block diagram of yet another embodiment of the video decoding apparatus of the present invention.

FIG. 16 is a block diagram of the configuration of the image decoding apparatus 40. The video decoding apparatus 40 includes the frame memory 101, the predictive image producing portion 103, the prediction residual reconstructing portion 109, the local decoded image producing portion 110, the transform candidate deriving portion 302, and a variable-length code decoding portion 401.

The variable-length code decoding portion 401 decodes the prediction parameter, the transform selection flag, the transform coefficient, and the list of transform candidate deriving rule based on the encoded data and the list of transform candidate that are input thereinto, and outputs the decoding results. More specifically, the variable-length code decoding portion 401: first decodes and outputs the list of transform candidate deriving rule; then, decodes the prediction parameter from the encoded data and outputs the prediction parameter; decodes the transform selection flag from the encoded data using the list of transform candidate and outputs the transform selection flag; and, finally, decodes the transform coefficient from the encoded data using the transform selection flag and outputs the transform coefficient.

<Operations of Video Decoding Apparatus 40>

Operations of the video decoding apparatus 40 will be described.

(Step S230) The encoded data externally input into the video decoding apparatus 40 is sequentially input into the variable-length code decoding portion 401 in frames. Processes of S231 to S239 as follows are sequentially executed for the encoded data that corresponds to each frame.

(Step S231) The variable-length code decoding portion 401 decodes the list of transform candidate deriving rule that corresponds to the frame to be processed, from the encoded data input thereinto, and outputs the list of transform candidate deriving rule to the transform candidate deriving portion 302.

(Step S232) The variable-length code decoding portion 401 divides the encoded data for each frame input thereinto into encoded data for each expanded MB. Processes of steps S233 to S239 as follows are sequentially executed for encoded data corresponding to each expanded MB.

(Step S233) The variable-length code decoding portion 401 decodes the prediction parameter from each of encoded data corresponding to an expanded MB to be processed, and outputs the prediction parameter to the transform candidate deriving portion 302.

(Step S234) The transform candidate deriving portion 302 derives the list of transform candidate for each partition of the expanded MB to be processed based on the list of transform candidate deriving rule and the prediction parameter that are input thereinto, and outputs the list of transform candidate to the variable-length code decoding portion 401.

(Step S235) The variable-length code decoding portion 401 decodes the transform selection flag that corresponds to the MB to be processed based on the encoded data and the transform restriction that are input thereinto, and outputs the transform selection flag to the prediction residual reconstructing portion 109.

(Step S236) The variable-length code decoding portion 202 decodes the transform coefficient that corresponds to the expanded MB to be processed, based on the encoded data input thereinto and the transform selection flag derived at (step S235), and outputs the transform coefficient to the prediction residual reconstructing portion 109.

(Step S237) The predictive image producing portion 103 produces the predictive image that corresponds to the expanded MB to be processed based on the prediction parameter input thereinto and the local decoded image recorded in the frame memory 101, and outputs the predictive image to the local decoded image producing portion 110.

(Step S238) The prediction residual reconstructing portion 109 applies the inverse frequency transform that corresponds to the frequency transform specified by the transform selection flag input thereinto, to the transform coefficient input thereinto, thereby, reconstructs the prediction residual that corresponds to the expanded MB to be processed, and outputs the reconstructed prediction residual to the local decoded image producing portion 110.

(Step S239) The local decoded image producing portion 110 produces the local decoded image based on the prediction residual and the predictive image that are input thereinto, outputs the local decoded image to the frame memory 101 to record the local decoded image in the frame memory 101, and externally outputs the local decoded image as the area on the decoded video that corresponds to the block to be processed.

As above, according to the video decoding apparatus 40, the decoded video can be produced from the encoded data produced by the video encoding apparatus 11.

A portion or all of the video encoding apparatus and the video decoding apparatus in each of the embodiments may typically be implemented as an LSI (Large Scale Integration) that is an integrated circuit. Each of the functional blocks of the video encoding apparatus and the video decoding apparatus may individually be implemented as a chip, or a portion or all of those functional blocks may be integrated into one chip. The approach of implementation thereof as an integrated circuit(s) may be realized by not only an LSI but also a dedicated circuit(s) or a multi-purpose processor (s). When a technique of implementation thereof as integrated circuit(s) is established that supersedes LSIs due to the advancement of the semiconductor technology, such technique may also be used.

EXPLANATIONS OF LETTERS OR NUMERALS

10 . . . video encoding apparatus, 11 . . . video encoding apparatus, 20 . . . video decoding apparatus, 21 . . . video decoding apparatus, 30 . . . video encoding apparatus, 40 . . . video decoding apparatus, 101 . . . frame memory, 102 . . . prediction parameter determining portion, 103 . . . predictive image producing portion, 104 . . . transform restriction deriving portion, 105 . . . frequency transform determining portion, 106 . . . prediction residual producing portion, 107 . . . transform coefficient producing portion, 108 . . . variable-length-encoding portion, 109 . . . prediction residual reconstructing portion, 110 . . . local decoded image producing portion, 111 . . . transform candidate deriving portion, 112 . . . frequency transform determining portion, 113 . . . variable-length-encoding portion, 201 . . . variable-length code decoding portion, 202 . . . variable-length code decoding portion, 301 . . . candidate list deriving rule determining portion, 302 . . . transform candidate deriving portion, 303 . . . variable-length-encoding portion, 401 . . . variable-length code decoding portion.

The invention claimed is:

1. A video decoding apparatus that executes a decoding processing for input encoded data for each block, comprising:
 a variable-length decoding portion that decodes a partition structure of a block to be processed from the input encoded data;
 a predictive image producing portion that produces a predictive image for each partition that is specified by the partition structure; and
 a transform candidate deriving portion that determines a list of transform candidate that is a list of applicable transforms based on partition shape information, which partition shape information characterizes each partition with respect to at least one of partition size, a feature of partition size, and a layer in the partition structure, wherein
 the variable-length-decoding portion decodes a transform selection flag based on the input encoded data and the list of transform candidate as well as decodes a transform coefficient of the block to be processed based on the transform selection flag,
 the video decoding apparatus further comprises:
 a prediction residual reconstructing portion that reconstructs a prediction residual by applying inverse transforms to the transform coefficient, the inverse transforms corresponding to transforms, the transforms being specified by the transform selection flag; and
 a local decoded image producing portion that outputs decoded image data based on the predictive image and the prediction residual, the decoded image data corresponding to the block to be processed;
 wherein the list of applicable transforms is included in a predetermined transform preset, the transform preset is a predetermined useable transform set.

2. A video encoding apparatus that divides an input video into predetermined size blocks and executes an encoding processing for each block, comprising:
 a prediction parameter determining portion that determines a partition structure of the block;
 a predictive image producing portion that produces a predictive image for each partition specified by the partition structure;
 a transform coefficient producing portion that applies any one of transforms included in a predetermined transform preset to a prediction residual that is a difference between the predictive image and the input video;
 a transform candidate deriving portion that determines a list of transform candidate that is a list of applicable transforms based on partition shape information, which partition shape information characterizes each partition with respect to at least one of partition size, a feature of partition size, and a layer in the partition structure;
 a frequency transform determining portion that, for each of the blocks, determines a transform selection flag indicating transforms to be applied to the prediction residual in the block from among transforms included in the list of transform candidate; and
 a variable-length-encoding portion that variable-length-codes the transform selection flag based on the list of transform candidate;
 wherein the transform preset is a predetermined useable transform set.

* * * * *